US012371306B2

(12) United States Patent
Sikora et al.

(10) Patent No.: US 12,371,306 B2
(45) **Date of Patent: *Jul. 29, 2025**

(54) APPARATUS, SYSTEM, AND METHOD TO CONTROL TORQUE OR LATERAL THRUST APPLIED TO A LOAD SUSPENDED ON A SUSPENSION CABLE

(71) Applicant: Vita Inclinata IP Holdings LLC, Broomfield, CO (US)

(72) Inventors: Derek Sikora, Denver, CO (US); Logan Goodrich, Golden, CO (US); Preston Fitzrandolph, Boulder, CO (US)

(73) Assignee: Vita Inclinata IP Holdings LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/523,266

(22) Filed: Nov. 29, 2023

(65) Prior Publication Data

US 2024/0101399 A1 Mar. 28, 2024

Related U.S. Application Data

(63) Continuation of application No. 17/953,259, filed on Sep. 26, 2022, now Pat. No. 11,834,305, which is a continuation-in-part of application No. 16/847,448, filed on Apr. 13, 2020, now Pat. No. 11,618,566.

(60) Provisional application No. 62/833,394, filed on Apr. 12, 2019.

(51) Int. Cl.
*B66C 13/46* (2006.01)
*B66C 13/06* (2006.01)

(52) U.S. Cl.
CPC .............. *B66C 13/46* (2013.01); *B66C 13/06* (2013.01)

(58) Field of Classification Search
None
See application file for complete search history.

(56) References Cited

U.S. PATENT DOCUMENTS

| | | | |
|---|---|---|---|
| 1,935,283 | A | 11/1933 | Adams |
| 2,264,936 | A | 12/1941 | Dorsa |
| 2,428,656 | A | 10/1947 | Elliott et al. |
| 2,651,533 | A | 9/1953 | Cecil |

(Continued)

FOREIGN PATENT DOCUMENTS

| | | | |
|---|---|---|---|
| EP | 0606108 | A1 | 7/1994 |
| GB | 2327657 | A | 2/1999 |

(Continued)

OTHER PUBLICATIONS

All pages, Written Opinion dated Apr. 30, 2020 for PCT Application No. PCT/US2020/017790, filed Feb. 11, 2020.

(Continued)

*Primary Examiner* — Anand P Bhatnagar
(74) *Attorney, Agent, or Firm* — Martin Spencer Garthwaite

(57) ABSTRACT

Disclosed are systems, apparatuses, and methods for and related to dynamic control of torque and or lateral thrust applied to a load suspended on a suspension cable to thereby achieve a target orientation or position or to otherwise move with reduced self-induced cyclic motion, with better behavior, and or to respond to changes in the load or disturbance forces.

19 Claims, 12 Drawing Sheets

(56) References Cited

U.S. PATENT DOCUMENTS 2,717,656 A 9/1955 Bannister
3,036,797 A 5/1962 Domenico
3,044,818 A 7/1962 Harry
3,210,115 A 10/1965 Irving et al.
3,265,336 A 8/1966 Peterson
3,498,476 A 3/1970 Mattson et al.
3,554,468 A 1/1971 Mcvicar
3,598,440 A 8/1971 Ramsden et al.
3,601,342 A 8/1971 Piasecki
3,602,544 A 8/1971 Marsh
3,656,796 A 4/1972 Cook
3,690,602 A 9/1972 Marsh
3,724,817 A 4/1973 Simons
3,829,052 A 8/1974 Flannelly
3,833,189 A 9/1974 Fowler et al.
3,838,836 A 10/1974 Asseo et al.
3,904,156 A 9/1975 Smith
3,946,971 A 3/1976 Chadwick
4,124,181 A 11/1978 Kolwey
4,138,078 A 2/1979 Hester et al.
4,267,987 A 5/1981 McDonnell
4,364,704 A 12/1982 Dreesen et al.
4,378,919 A 4/1983 Smith
4,553,719 A 11/1985 Ott
4,601,444 A 7/1986 Lindenbaum
4,695,012 A 9/1987 Lindenbaum
4,747,745 A 5/1988 Pippen et al.
4,826,109 A 5/1989 Camus
4,881,601 A 11/1989 Smith
4,883,184 A 11/1989 Albus
4,889,297 A 12/1989 Ikeda
4,984,757 A 1/1991 Hartung et al.
5,071,184 A 12/1991 Dessaux
5,071,573 A 12/1991 Coffindaffer et al.
5,125,707 A 6/1992 Chaen et al.
5,131,491 A 7/1992 Varner et al.
5,143,326 A 9/1992 Parks
5,190,250 A 3/1993 DeLong et al.
5,249,652 A 10/1993 Leitzman et al.
5,273,333 A 12/1993 Hatfield et al.
5,299,845 A 4/1994 Gabriel
5,344,203 A 9/1994 Tollenaere
5,352,056 A 10/1994 Chandler
5,358,219 A 10/1994 Shenk et al.
5,396,815 A 3/1995 Polites et al.
5,443,566 A 8/1995 Rushmer et al.
5,451,032 A 9/1995 Rhoads
5,465,925 A 11/1995 Connolly et al.
5,499,785 A 3/1996 Roberts et al.
5,518,205 A 5/1996 Wurst et al.
5,524,870 A 6/1996 Tallent et al.
5,562,394 A 10/1996 Brown, Jr.
5,593,113 A 1/1997 Cox
5,613,722 A 3/1997 Fandrich et al.
5,816,098 A 10/1998 Kanki et al.
5,816,636 A 10/1998 Gibson et al.
5,871,249 A 2/1999 Williams
5,898,746 A 4/1999 Baversten et al.
5,927,438 A 7/1999 Ostrobrod
5,961,563 A 10/1999 Overton
6,189,834 B1 2/2001 Dietz et al.
6,199,793 B1 3/2001 Hainsworth et al.
6,439,407 B1 8/2002 Jacoff et al.
6,533,220 B2 3/2003 Schuster
D473,482 S 4/2003 Felmingham
6,578,796 B2 6/2003 Maeda
6,588,985 B1 * 7/2003 Bernard .................. B63C 11/42
166/338
6,708,926 B2 3/2004 Bonisch
6,814,185 B1 11/2004 Ostrobrod
6,983,833 B2 1/2006 Ivers et al.
7,028,351 B1 4/2006 Frieder et al.
7,131,515 B2 11/2006 Gartsbeyn et al.
7,267,240 B2 9/2007 Maurer et al.
7,720,582 B2 5/2010 Makinadjian
D617,293 S 6/2010 Yoshihashi
7,887,011 B1 2/2011 Baldwin
7,948,237 B2 5/2011 Kuzmin et al.
8,025,167 B2 * 9/2011 Schneider ............... B66C 13/46
212/276
8,131,384 B2 3/2012 Karpman et al.
8,157,205 B2 4/2012 McWhirk
8,226,042 B1 7/2012 Howell et al.
8,231,083 B2 7/2012 Kutzmann et al.
8,292,229 B2 10/2012 Pancotti et al.
D671,293 S 11/2012 Fredriksson
8,413,923 B2 4/2013 Brenner et al.
8,496,279 B2 7/2013 Aoki
8,534,607 B2 9/2013 Tardiff et al.
8,534,608 B1 9/2013 Cox, IV
8,591,161 B1 11/2013 Bernhardt
8,840,355 B1 9/2014 Kulesha
8,886,402 B1 11/2014 Lou
8,888,048 B2 11/2014 Figoureux et al.
8,894,050 B2 11/2014 Wootten et al.
8,899,903 B1 12/2014 Saad et al.
8,903,568 B1 12/2014 Wang et al.
8,925,901 B2 1/2015 Gaillard
8,938,325 B1 1/2015 McGinnis et al.
8,967,533 B2 3/2015 DeVaul et al.
9,027,976 B1 5/2015 Tollenaere
9,096,294 B1 8/2015 Dong et al.
9,114,871 B2 8/2015 Woodworth et al.
9,194,977 B1 11/2015 Dungan et al.
9,205,922 B1 12/2015 Bouwer
9,223,008 B1 12/2015 Hartman et al.
9,242,741 B1 1/2016 Cockell
9,302,770 B2 4/2016 Burgess et al.
9,375,841 B1 6/2016 Kemper
9,422,139 B1 8/2016 Bialkowski et al.
9,676,481 B1 6/2017 Buchmueller
9,688,404 B1 6/2017 Buchmueller et al.
9,751,732 B2 * 9/2017 May ........................ B66C 23/18
9,797,723 B1 10/2017 Huang
9,800,091 B2 10/2017 Nugent, Jr. et al.
9,836,063 B1 12/2017 Bonawitz et al.
9,849,981 B1 12/2017 Burgess et al.
9,850,113 B2 12/2017 Melin et al.
9,881,506 B1 1/2018 Gentry
9,908,756 B2 3/2018 Heravi et al.
9,958,876 B2 5/2018 Lind et al.
10,023,312 B2 7/2018 Repp et al.
10,023,313 B2 7/2018 Behrens et al.
10,071,804 B1 9/2018 Buchmueller et al.
10,112,805 B1 10/2018 Joralmon
10,286,943 B1 5/2019 Greenblatt et al.
10,288,075 B2 5/2019 Ishiba
10,451,504 B2 10/2019 Campbell et al.
10,479,503 B2 11/2019 Sikora et al.
10,519,013 B2 12/2019 Curran et al.
10,676,190 B2 6/2020 Mitchell et al.
10,858,104 B2 * 12/2020 Maghsoodi .............. B66D 1/54
10,870,558 B2 12/2020 Sikora et al.
10,899,586 B2 1/2021 Cranney, III
10,918,892 B2 2/2021 Dickson
10,940,061 B2 3/2021 Sikora et al.
10,960,976 B2 3/2021 Bosma et al.
11,008,198 B2 * 5/2021 Sikora ...................... B64D 1/22
11,142,316 B2 10/2021 Sikora et al.
11,142,433 B2 10/2021 Sikora et al.
11,209,836 B1 12/2021 Sikora et al.
11,260,963 B2 * 3/2022 Prager .................. G05D 1/0202
11,339,034 B2 5/2022 Sikora et al.
11,370,642 B2 6/2022 Markwell
11,409,266 B2 * 8/2022 Cella .................... H04B 17/345
11,618,566 B1 4/2023 Sikora et al.
11,620,597 B1 4/2023 Sikora
11,713,122 B2 * 8/2023 Shannon ................ B66D 1/485
701/3
11,746,951 B2 9/2023 Sikora et al.
2002/0113448 A1 8/2002 Kazerooni et al.
2003/0085319 A1 5/2003 Wagner et al.
2003/0121024 A1 6/2003 Hill et al.
2003/0220177 A1 11/2003 Orlando

(56) References Cited

U.S. PATENT DOCUMENTS

2004/0026349 A1 2/2004 Colgate et al.
2004/0032140 A1 2/2004 Solstad
2005/0072965 A1 4/2005 Sanders et al.
2005/0242237 A1 11/2005 Scott
2007/0200032 A1 8/2007 Eadie et al.
2008/0027566 A1 1/2008 Baek et al.
2008/0163892 A1 7/2008 Huang et al.
2008/0272566 A1 11/2008 Thompson
2009/0004004 A1 1/2009 Vincenzi
2009/0152391 A1 6/2009 McWhirk
2009/0200428 A1 8/2009 Smith et al.
2010/0000349 A1 1/2010 Stevens et al.
2010/0012771 A1 1/2010 Jess
2010/0176618 A1 7/2010 Souke et al.
2010/0237183 A1 9/2010 Wilson et al.
2010/0291707 A1 11/2010 Mirkin et al.
2010/0319910 A1 12/2010 Ives et al.
2011/0168514 A1 7/2011 Lee
2011/0192932 A1 8/2011 Brenner et al.
2012/0006779 A1 1/2012 Mills et al.
2012/0145832 A1 6/2012 Schuster
2012/0150364 A1 6/2012 Tillotson et al.
2012/0271582 A1 10/2012 Bageshwar et al.
2012/0292434 A1 11/2012 Welsh
2012/0293177 A1 11/2012 Dodds
2013/0054054 A1 2/2013 Tollenaere et al.
2013/0056586 A1 3/2013 Occhiato et al.
2013/0081245 A1 4/2013 Vavrina et al.
2013/0270393 A1 10/2013 Shrapnel
2013/0299634 A1 11/2013 Haggard
2014/0154965 A1 6/2014 Han et al.
2014/0224755 A1 8/2014 Eriksson et al.
2014/0252170 A1 9/2014 Prud'Homme-Lacroix
2014/0333232 A1 11/2014 Verheyen
2015/0041598 A1 2/2015 Nugent et al.
2015/0151837 A1 6/2015 Sane et al.
2015/0360779 A1 12/2015 Behrens et al.
2016/0009393 A1 1/2016 Repp et al.
2016/0009531 A1 1/2016 Saliba et al.
2016/0031683 A1 2/2016 Fenker et al.
2016/0048131 A1 2/2016 Lesperance et al.
2016/0236779 A1 8/2016 Thomas et al.
2016/0240417 A1 8/2016 Tomida
2016/0297650 A1 10/2016 Bang
2016/0298962 A1 10/2016 Lee
2016/0332728 A1 11/2016 Winfree et al.
2016/0340030 A1 11/2016 Roussey et al.
2016/0340035 A1 11/2016 Duru
2016/0340039 A1 11/2016 Waltner et al.
2017/0009859 A1 1/2017 Sevagen
2017/0052676 A1 2/2017 Pulier et al.
2017/0073055 A1 3/2017 Song
2017/0088261 A1 3/2017 Sequeira et al.
2017/0129749 A1 5/2017 Mijangos et al.
2017/0138737 A1 5/2017 Cordova et al.
2017/0197718 A1 7/2017 Buchmueller
2017/0217566 A1 8/2017 Ichinose
2017/0276139 A1 9/2017 Ishiba
2017/0284795 A1 10/2017 Carlson et al.
2017/0291707 A1 10/2017 Veronesi et al.
2018/0057318 A1 3/2018 Benton et al.
2018/0072404 A1 3/2018 Prager et al.
2018/0099748 A1 4/2018 Lesperance et al.
2018/0208309 A1 7/2018 Wang
2018/0229855 A1 8/2018 Sane et al.
2018/0251346 A1 9/2018 Thomson et al.
2018/0252616 A1 9/2018 Bryson et al.
2018/0282130 A1 10/2018 Kale et al.
2018/0339891 A1 11/2018 Ijadi-Maghsoodi et al.
2019/0016480 A1 1/2019 Kashiwa et al.
2019/0031474 A1 1/2019 Stilborn et al.
2019/0033892 A1 1/2019 Gomez et al.
2019/0055111 A1 2/2019 Cranney, III
2019/0193827 A1 6/2019 Zerweckh
2019/0236370 A1 8/2019 Man
2019/0241267 A1 8/2019 Sikora et al.
2019/0337776 A1 11/2019 Fanello et al.
2020/0087121 A1 3/2020 Ohayon et al.
2020/0165010 A1 5/2020 Sun et al.
2020/0180763 A1 6/2020 Schütz et al.
2020/0182252 A1 6/2020 Nakasuji et al.
2020/0210704 A1 7/2020 Han et al.
2020/0222257 A1 7/2020 Sikora et al.
2020/0231415 A1 7/2020 Sikora et al.
2020/0271270 A1* 8/2020 Sikora .................. F16M 13/005
2020/0369492 A1 11/2020 Sikora et al.
2020/0400330 A1 12/2020 Przybylski et al.
2021/0017000 A1* 1/2021 Sikora ...................... B66C 13/46
2021/0017002 A1* 1/2021 Abdallah ............... B25J 13/085
2021/0122615 A1* 4/2021 Rauscher .............. B66C 13/063
2021/0229808 A1* 7/2021 Sikora ...................... B64D 9/00
2021/0371250 A1 12/2021 Bedgood et al.
2021/0371252 A1* 12/2021 Sikora ...................... A61G 1/06
2022/0121225 A1* 4/2022 Sikora ...................... B64D 1/22
2022/0002746 A1 5/2022 Sikora
2022/0002748 A1 5/2022 Sikora
2022/0135378 A1 5/2022 Sikora et al.
2022/0274696 A1 9/2022 Sikora et al.
2022/0274809 A1 9/2022 Sikora et al.
2022/0277472 A1 9/2022 Birchfield et al.
2022/0281721 A1 9/2022 Sikora et al.
2022/0371736 A1* 11/2022 Sikora ...................... B64D 1/22
2023/0117935 A1 4/2023 Al-Husseini et al.

FOREIGN PATENT DOCUMENTS

GB 2457149 A 8/2009
GB 2513646 A 11/2014
JP H04256686 A 9/1992
JP H0543184 A 2/1993
JP H05193584 A 8/1993
JP H07179288 A 7/1995
JP 08312588 A 11/1996
JP H09317795 A 12/1997
JP 10032961 2/1998
JP H10305989 A 11/1998
JP H1111859 A 1/1999
JP 11037093 A 2/1999
JP 2016210607 A 12/2016
JP 2017500257 A 1/2017
JP 2018140860 A 9/2018
JP 2019023143 A 2/2019
JP 6554258 B1 7/2019
NO 20171181 A1 1/2019
WO 2011012915 A1 2/2011
WO 2014076189 A1 5/2014
WO 2018090104 A1 5/2018
WO 2018234670 A1 12/2018
WO WO2019156782 A1 8/2019
WO 2020167867 A1 8/2020
WO WO2020176665 A1 9/2020
WO WO2021016277 A1 1/2021
WO WO2021108703 A1 6/2021
WO WO2021108714 A1 6/2021
WO 2021194628 A2 9/2021
WO WO2022250736 A1 12/2022
WO WO2023211499 A1 11/2023

OTHER PUBLICATIONS

Extended European Search Report and Search Opinion, Application No. EP 19 751 097.7, mailed Aug. 31, 2021, 15 pages.
Internal Search Report mailed Apr. 30, 2020 for PCT/US2020/017790, filed Feb. 11, 2020.
International Search Report dated Apr. 3, 2019, for PCT/US19/13603 filed Jan. 15, 2019.
International Search Report in PCT/US2020/062414, mailed Feb. 19, 2021, entire document.
International Search Report mailed May 27, 2020 for PCT US20/19967 filed Feb. 26, 2020.
International Search Report mailed Oct. 6, 2020, for PCT/US2020/042936, filed Jul. 2020.

(56) References Cited

OTHER PUBLICATIONS

Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.
Written Opinion in PCT/US2020/062414, mailed Feb. 19, 2021, entire document.
Written Opinion mailed Apr. 3, 2019, for PCT/US19/13603, filed Jan. 15, 2019.
Written Opinion mailed May 27, 2020, for PCT/US20/19967, filed Feb. 26, 2020.
Written Opinion mailed Oct. 6, 2020 for PCT/US2020/042936 filed Jul. 21, 2020.
Young, L.A ,"Enhanced Rescue Lift Capability", 63rd Annual Forum of the AHS international, Virginia Beach, VA, May 1-3, 2007 (May 2007), Fig.2,5,12,16, Abstract pp. 6-12.

* cited by examiner

APPARATUS, SYSTEM, AND METHOD TO CONTROL TORQUE OR LATERAL THRUST APPLIED TO A LOAD SUSPENDED ON A SUSPENSION CABLE

FIELD

This disclosure is directed to improved apparatus, system, method for and related to dynamic control of torque and or lateral thrust applied to a load suspended load on a suspension cable to achieve a target orientation or position with reduced self-induced cyclic motion and or to respond to changes in circumstances of the system, apparatus, and methods.

BACKGROUND

People and or equipment ("loads") may be suspended on a suspension cable, e.g. below a helicopter, crane, or locations on a non-mobile object (e.g. loads suspended on a suspension cable secured to beam of a bridge, projecting from a building, or the like). The suspension cable may be part of a hoist system, to raise and lower the suspension cable and load. Loads are typically not buoyant, though may be. Cranes, helicopters and non-mobile objects may be referred to herein as "carriers". When a load is secured to a suspension cable, it may also be referred to herein as a, "suspended load".

During operations with suspended loads, suspended loads may be subject to winds and other external and internal disturbances or dynamics that may cause the load to move in an unstable, unpredictable, undesirable, and or hazardous manner.

Operators of carriers, such as helicopter and crane crews, may use equipment that provides control of a suspended load, including equipment that provides suspended load control remote from the carrier, e.g. at or near the suspended load, using powered fans, such as electric ducted fans ("EDF") or flywheels (together, a powered fan or flywheel may be referred to herein as a "thruster" or as an "EDF"). Such equipment is referred to herein as a suspended load control system ("SLCS").

Observed motion of suspended loads may include the following components: vertical translation (motion up and down) along the Y axis (referred to herein as "vertical translation"); horizontal translation along either or both the X and Z axis; and rotation or "yaw" about the Y axis. Roll (rotation about the X axis) and pitch (rotation about the Z axis) may also occur, though if a load is suspended by a cable and is not buoyant, the typical motions are vertical translation, horizontal translation, and yaw. An example of axis, when discussed herein, are illustrated in FIG. 1, axis 120. Vertical and horizontal translation and yaw of a suspended load may be caused by movement of the suspension cable, movement of the carrier, winding of a wench up or down relative to a carrier, movement of the load, differences in speed and momentum between the suspended load and the carrier, by wind—including propeller wash, environmental wind—impacts, and external forces. Horizontal translation can manifest as lateral motion or as conical pendulum motion of the load, with the pivot point of the pendulum where the suspension cable is secured to the carrier ("pendular motion"). Because the carrier may have a relatively fixed elevation and because the suspension cable may have low stretch, pendular motion generally also includes a component of vertical translation. Pendular motion may also be referred to as elliptical motion. Lateral motion may be understood as a special case of pendular motion, when the load swings only along one stable arc.

When torque is imparted on a suspended load, wherein the torque is not imparted symmetrically around a center of mass of the suspended load (which may be consistent with a location of the suspension cable, relative to the suspended load), one or more of yaw of the suspended load and or pendular motion of the suspended load may result.

Yaw, lateral motion, and pendular motion complicate lift operations, cause delays, may cause injury or death of aircrew, crane operators, and of people on the ground, and may cause damage to the suspended load and or other objects. Yaw can produce dizziness and disorientation in humans and transported non-human animals. Yaw and lateral and pendular motion can also interfere with bringing a suspended load into a carrier and or with delivering a suspended load to a location. For example, delivery of a load to a deck of a ship may be complicated by pendular motion or yaw of the load, even if the deck is stable and is not also subject to heave, roll, or pitch, as it may be. For example, bringing a person in a litter into a helicopter or onto a helicopter strut may be hazardous if the litter undergoes yaw or pendular motion as it is drawn up to the helicopter. One or more components of undesired motion of the load may increase in amplitude and or frequency and otherwise grow more pronounced as a load is drawn up to the carrier and the suspension cable shortens. Horizontal and pendular motion of a load can also interact with the carrier to produce dangerous reactive or sympathetic motion in the carrier.

In addition, some suspended load operations may involve an obstacle, such as a surface, cliff wall, building, bridge, tree limb, overhang, or other obstacle that may interfere with one or more of carrier, load, and or suspension cable.

In addition, attempts to induce yaw in, to stop yaw of, or to drive a suspended load to a position may result in the suspended load rotating "too far" or "too fast". E.g., when it is desired to stop a rotating suspended load, the suspended load may have angular momentum which either causes the suspended load to rotate "too far", past a target orientation, or "too fast", past a then-current orientation which obtained when a rotation instruction was discontinued.

In addition, a thruster used to impart torque or thrust on the suspended load may have limited power. Limitations on power available to the thruster may come from finite battery power or fuel local to the thruster, by finite remote power or fuel that may be transmitted, e.g. through a conduit, to the thruster, by heat production and heat exhaust limitations of a motor of the thruster, and the like.

Consumption of power and or passage of time may be required to rotate or drive the suspended load to a desired orientation or position; this consumption of power and passage of time may be increased if the suspended load is rotated "too far" or "too fast" by the SLCS.

Many control systems are prone to driving a system "too far" or "too fast" or to otherwise produce undesirable behavior, relative to an objective. For example, proportional integral derivative ("PID") control systems are known to control a system to achieve a target objective, such as a target speed, though are also known to produce oscillation of the system relative to the target objective, either as the system moves toward the target or even as the system attempts to maintain a steady state relative to the target. Such behavior may be referred to herein as, "self-induced cyclic motion" and or as "seeking behavior".

In many contexts, such seeking behavior is acceptable. However, in the context of an SLCS, for which the target objective may be a particular orientation or a particular position, such seeking behavior may be particularly undesirable. For example; if the SLCS and load are not tightly connected and the SLCS engages in seeking behavior, resonant momentum transfer between the SLCS and load may cause the seeking behavior to become unstable and or a reasonably stable orientation or position may not be attainable. For example, even seeking behavior which can arrive at a reasonably stable orientation or position may required additional time to do so, as an operator of the SLCS waits for the seeking behavior to stabilize. For example, the SLCS may be battery operated and may have a limited deployment time; seeking behavior may expend the limited power, including to continuously address self-induced cyclic motion even after the orientation or position is achieved.

In addition, operating circumstances of an SLCS may change significantly during use. By way of example, the SLCS may be rotated to an orientation or driven to a position without a load or with a partial load and then, when in the orientation or position, be attached to a load or the load may be increased. By way of example, the physical shape of a load may change, such as to extend further from or contract toward the center of mass, either of which may change the rotational inertia of the load. By way of example, disturbance forces on the SLCS, such as from wind or other external forces, may change, such as by increasing or decreasing. In a changing environment, static control of thrusters of the SLCS may result in undesirable behavior, such as providing too much power when the load or disturbances is relatively light, not providing enough power when the load or disturbances is relatively heavy. Changes in performance characteristics of an SLCS may be difficult for operators of an SLCS to adapt to and may require the operator to undergo training in relation thereto.

An SLCS, a carrier, and other components involved in control of a suspended load may achieve a target orientation or position in a shorter time period, may achieve a target orientation or position more efficiently, may achieve or maintain a target orientation or position with reduced power, may achieve a target orientation or position in a manner which is easier for a human operator to control, may achieve a target orientation or position with less hazardous behavior, may dynamically modify behavior in response to changes in the load and the environment, and or use of an SLCS may be made more likely if the SLCS can respond to changes in the load and in the environment and or if the SLCS can control torque and or lateral thrust applied to a suspended load to achieve a target orientation or position or to move with reduced self-induced cyclic motion or seeking behavior.

DETAILED DESCRIPTION

Figure 1:
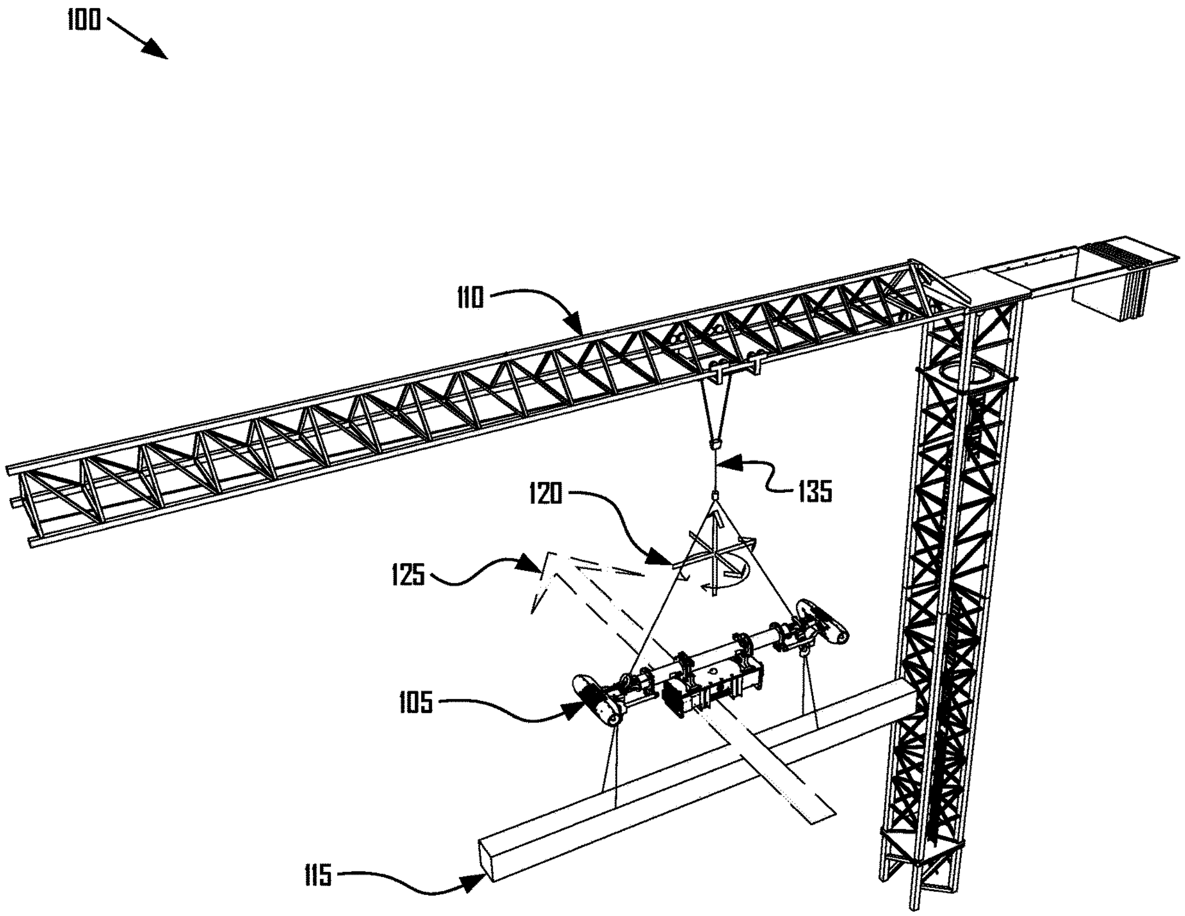
FIG. 1 illustrates a suspended load control system ("SLCS"), a load, and a carrier, in which the SLCS and load are in a starting position relative to a target orientation, in accordance with one embodiment.

In various embodiments, as described further herein, a suspended load control system or suspended load stability system ("SLCS"), e.g. SLCS 105, independent from a carrier, e.g. carrier 110, uses a control system of SLCS 105, e.g. decision and control module 700, as well as logical components 501, operational components 900, and thrusters, e.g. thrusters 1205A-1205D (singular or plural, "thruster 1205"), to apply torque or lateral thrust to a suspended load, e.g. suspended load 115.

A system model performed by decision and control module 700 estimates state information such as mass of SLCS 105 and suspended load 115, cable length (between carrier and one or more of SLCS 105 and load), rotational inertia (or "mass-moment of inertia") of SLCS 105 and suspended load 115, movement, position, and rotation SLCS 105 and suspended load 115, and movement, position, and rotation of carrier 110, and thrust output from thruster 1205. The system model of decision and control module 700 further estimates disturbances, such wind force, impacts on SLCS 105 and suspended load 115, and relative SLCS 105 and carrier 110 motion. This state information and disturbance forces are not "hard-wired" into SLCS 105 but are and must be dynamically determined for the SLCS to change its behavior to address different operations and to address changing circumstances of a single operation.

Figure 2:
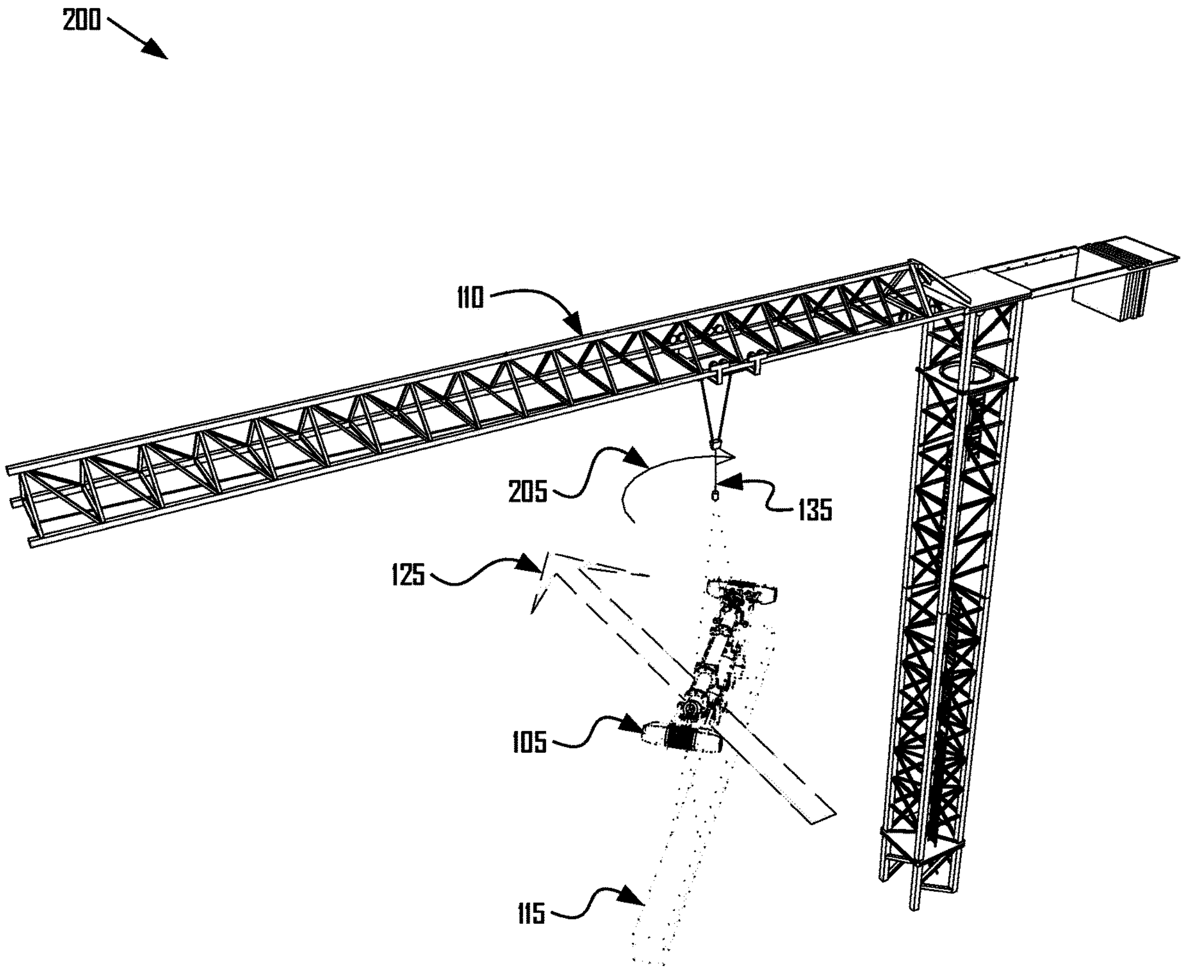
FIG. 2 illustrates SLCS, load, and carrier of FIG. 1, wherein the SLCS and load have undergone a first over-rotation, relative to the target orientation, in accordance with one embodiment.
Figure 3:
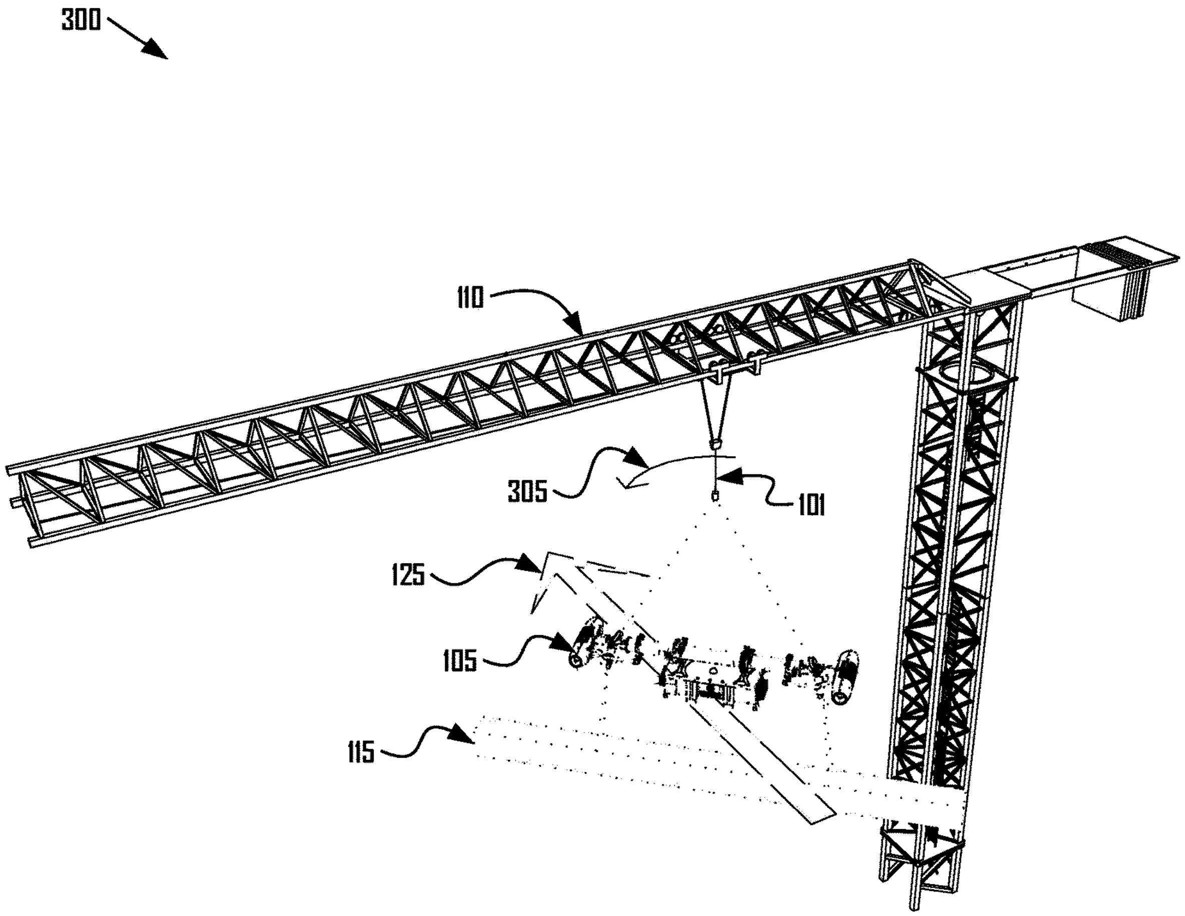
FIG. 3 illustrates SLCS, load, and carrier of FIG. 1, wherein the SLCS and load have undergone a second over-rotation, relative to the target orientation, in accordance with one embodiment.
Figure 4:
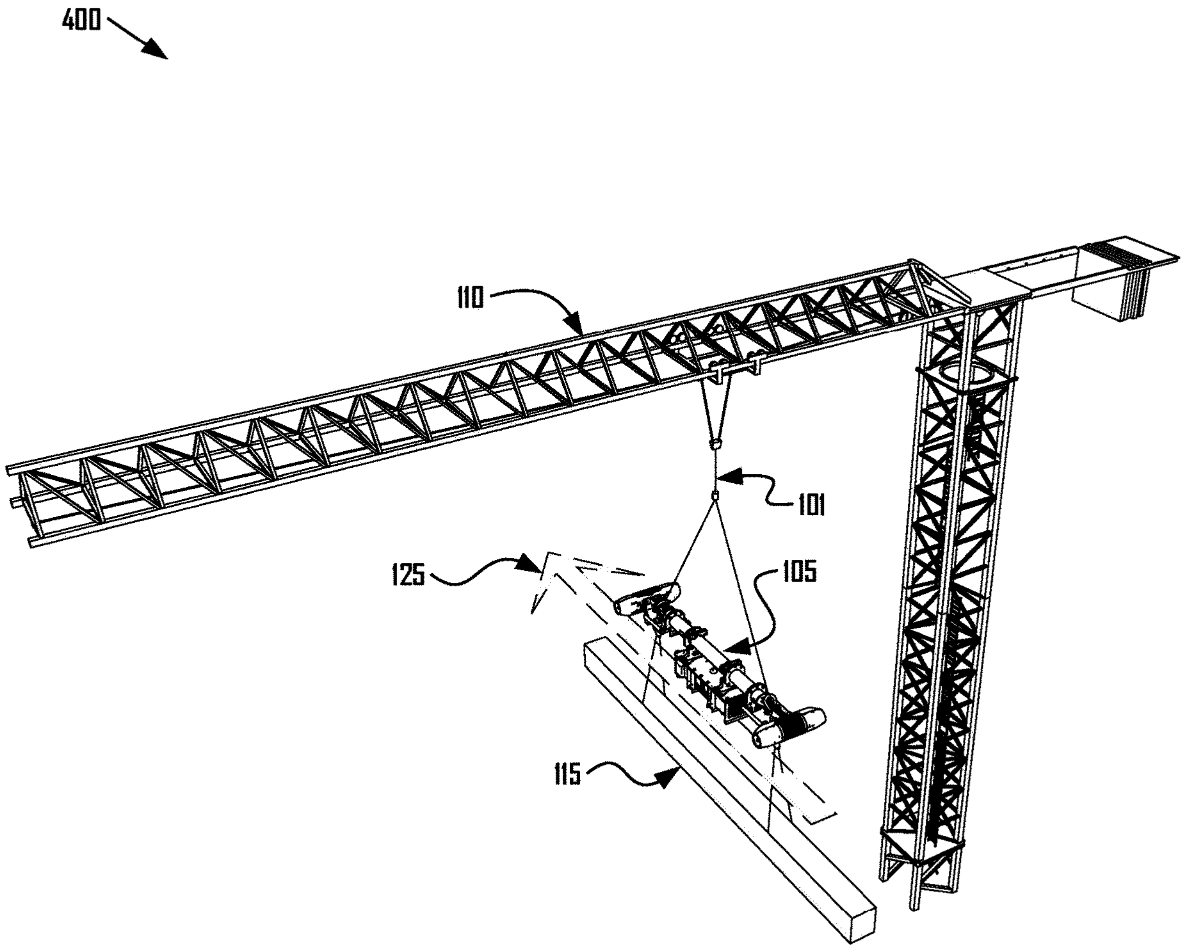
FIG. 4 illustrates SLCS, load, and carrier of FIG. 1, wherein the SLCS and load are at the target orientation, in accordance with one embodiment.

By way of example, FIG. 1 illustrates SLCS 105 and load 115 suspended below carrier 110 in scene 100; FIG. 2 illustrates SLCS 105 and load 115 suspended below carrier 110 in scene 200; FIG. 3 illustrates SLCS 105 and load 115 suspended below carrier 110 in scene 300; FIG. 4 illustrates SLCS 105 and load 115 suspended below carrier 110 in scene 400. Scene 100 through scene 400 illustrate how an operation may proceed without execution of gain adjustment module 1000.

In scene 100 through scene 400, thrusters of SLCS 105 comprise EDFs, though other sources of thrust, discussed herein, may be used to apply torque to rotate load 115 or may be used to apply lateral thrust to achieve a position. In scene 100, using an interface, such as remote pendant 1100, logical components 501 and operational components 900 of SLCS 105 may be instructed by an operator of SLCS 105 to moved SLCS 105 and load 115 toward target orientation 125. The instruction may be an instruction from a user of remote pendant 1100 to move in a direction toward target orientation 125 (target orientation 125 may not be specified by the user, but may be an orientation in a direction away from a current orientation) or the instruction may comprise target orientation 125 in a functional mode or command state, e.g. functional mode or command state discussed in block 620, to move SLCS 105 and load 115 to target orientation 125. In another example, when target orientation 125 is not specified by the user, but is an orientation in a direction away from a current orientation, when the user no long instructs to turn in the direction away from the then-current orientation, the then-current orientation (when the instruction is ceased) may become the target orientation 125. In another example, a position (or equivalently, a location) may be specified toward which SLCS 105 and load 115 are to move. In another example (not illustrated), an instruction may be made to implement a functional mode or command state in which undesired motion of SLCS 105 and load 115 is to be cancelled, such as rotation or pendular motion.

In scene 200 in FIG. 2, SLCS 105 has responded by applying torque to SLCS 105 and load 115 to rotate SLCS 105 and load 115 to target orientation 125; however, without operation of gain adjustment module 1000, SLCS 105 has over-rotated SLCS 105 and load 115, as indicated arrow 205 relative to target orientation 125. This may be due to a change in the mass or dimensions of load (e.g. if load 115 had been picked up), may be due to disturbance forces on SLCS 105 and load 115, including dynamic or changing disturbance forces such as wind. This may be due to self-induced cyclic movement or seeking behavior. Seeking behavior may be made worse by distance between SLCS 105 and load 115 and transfer of momentum between SLCS 105 and load 115.

In scene 300 in FIG. 3, SLCS 105 or an operator thereof has responded to the over-rotation of scene 200 by applying torque to SLCS 105 and load 115 to rotate SCLS 105 and load to target orientation 125; however, without operation of gain adjustment module 1000, SLCS 105 has again over-rotated SLCS 105 and load 115, as indicated arrow 305 relative to target orientation 125. This may be due to a change in the mass or dimensions of load (e.g. if load 115 had been picked up), may be due to disturbance forces on SLCS 105 and load 115, including dynamic or changing disturbance forces such as wind. This may be due to self-induced cyclic movement or seeking behavior. Seeking behavior may be made worse by distance between SLCS 105 and load 115 and cyclic transfer of momentum between SLCS 105 and load 115.

In scene 400 in FIG. 4, SLCS 105 or an operator thereof has responded to the over-rotation of scene 300 by applying torque to SLCS 105 and load 115 to rotate SCLS 105 and load to target orientation 125. In this instance, SLCS 105 has attained target orientation 125 with SLCS 105 and load 115. However, attaining target orientation 125 may have required expenditure of additional time and or power, to go through scene 200 and scene 300. In addition, maintaining target orientation 125 in scene 400 against, for example, disturbance forces on SLCS 105 and load 115 and or against self-induced cyclic movement or seeking behavior, may result in expenditure of additional power, output through thrusters, or may delay conclusion of the operation, because load 115 may not be stably aligned with target orientation 125.

The over-rotation and or seeking behavior illustrated in scene 100 through scene 400 may be undesirable, may have made the operation more hazardous, may have required greater training on the part of the operator to address, may have delayed performance of the operation, and or may be reduced efficiency of use of SLCS 105 (whether efficiency measured in terms of time or power use—power available to thrusters may be limited, as discussed herein).

In contrast, performance of the operation to move SLCS 105 and load 115 to target orientation 125 or position may be made better, may dynamically adjust to changing circumstances, may be made less hazardous, may be performed with less training on the part of the operator to address, may be performed more consistently, may be performed more quickly, and or may be performed with lower power use if gain adjustment module 1000 is executed.

Gain adjustment module 1000 may change one or more parameter (as noted elsewhere, references herein to a singular noun, such as "parameter", may refer to plural such nouns, such as "parameters") of decision and control module 700 to control a gain of a thrust control signal sent to thrusters. For example, decision and control module 700 may comprise a control loop, wherein the control loop is to determine the thrust control signal based at least in part on the last-measured orientation of the load, the target orientation of the load, and the parameter. The control loop may be organized in a cascade control architecture. In an embodiment, the parameter may act upon a difference between the last-measured orientation of the load and the target orientation. This difference may also be referred to as an "error". In an embodiment, the parameter may modify at least one of a proportional-based response to the error, an integral-based response to the error, or a derivative-based response to the error. Decision and control module 700 and or gain adjustment module 1000 (as stated, reference to a top-level component may refer to sub-components within the top-level component) may comprise an open loop, a closed, loop, or a feedforward loop.

Gain adjustment module 1000 may schedule modification of the parameter based on an operating point value. The operating point value may comprise at least one of a rotational inertial of the apparatus and load and or a disturbance force on the apparatus and load. The operating point value may be obtained from the system model, wherein the system model models state parameters of the apparatus, load, carrier and environmental disturbances. Modification of the parameter based on the operating point value may be referred to as "gain scheduling".

Modification of the parameter based on the operating point value may allow gain adjustment module 1000 to adapt to differing circumstances, such as when an SLCS 105 is accelerating, decelerating, or holding constant, as may be reflected by activity of the control loop during such circumstances. For example, if the control loop comprises a closed loop, such as a proportional, derivative, and integral closed loop ("PID controller"), then the parameter(s) may act on portions of the control loop, such as to modify at least one of a proportional-based response to the error, an integral-based response to the error, or a derivative-based response to the error. For example, if the control loop comprises a feedforward control loop, for example, a feedforward control loop using the system model and an estimated state therefrom, which may include an estimated future state, such as an angular rate, movement, position, and rotation of SLCS 105 and suspended load 115, a movement, position, and rotation of carrier 110, and thrust output from thruster 1205, then the parameter(s), as may be scheduled based on the operating point value, may act on the feedforward control loop to modify the thrust control signal to the thrusters.

By modifying operation of decision and control module 700 with gain adjustment module 1000, SLCS 105, including logical components 501 and operational components 900 of SLCS 105, responds to changing circumstances of operation of SLCS 105, such as changes in the load, changes in disturbance forces, to provide behavior suited to the then-current circumstances, and to allow a target orientation or position to be achieved with reduced self-induced cyclic motion or reduced seeking behavior or to allow torque or thrust to be applied with more consistent behavior (from the perspective of an operator).

With this complex state and disturbance model and with gain adjustment module 1000, the SLCS is able to control a load by dynamical modification of force output to thrusters to counteract yaw, pendular motion, to translate a load horizontally, such as to avoid an obstacle or to move a load into an offset position relative to a normal lowest-energy hanging position or "fall line" below an attachment point of a suspension cable on a carrier, such as below an arm that holds the suspension cable, and to do so with reduced self-induced cyclic motion, with better behavior (e.g. with behavior dynamically adapted to circumstances), and or to respond to changes in the load or disturbance forces.

An SLCS may be used to control the fine location and orientation or rotation of a load, independently from the carrier. Telemetry output from an SLCS may be used to provide feedback to a carrier crew or to processes executed by systems in a carrier. For example, the cable length estimated by an SLCS, or a location of an SLCS and load relative to a target or relative to the carrier may be output to a crew which controls a hoist or to a process which controls a hoist or to the hoist directly.

Without use of an SLCS, control of suspended loads include countermeasures installed on a carrier. For example, some airframes, such as a Skycrane helicopter, may have a rail system installed beneath a cabin to mitigate sway of a load, though, being remote from the suspended load, such rail system has marginal effect. Some approaches to this problem involve automated countering algorithms in an aircraft's stability augmentation system, though integration with an aircraft's control system is problematic and, again, the effect of such measures is limited. For example, crew chiefs who remain in a helicopter or other carrier during an extraction or operation try to affect a suspended load by pushing or pulling a suspension cable from the helicopter or carrier; such efforts have limited effect and can be hazardous. Crane and helicopter crew, both in the air and on the ground, may move loads at slow rates to minimize undesired motion or may use additional suspension cables or dedicated control cables or "tag lines" between the suspended load and the ground, neighboring structures, or the carrier; these measures increase time required to perform an operation with a suspended load, increase risks to ground and above-ground crew, increase costs, complexity, and risk of failure. All such measures are inadequate and highly problematic.

Consequently, an SLCS enhances mission safety and improves performance of carrier and suspended load operations as the SLCS dynamically determines and controls fine location and rotation of a load, separate from motion of the carrier, and as the SLCS provides telemetry information which may be used during a suspended load operation. An SLCS with gain adjustment may further make operation of the SLCS more predictable for human operators, may reduce seeking behavior, may reduce time and power expended during an operation, and or may adapt to changing circumstances of the SLCS and or load.

Once deployed and in-use, the SLCS is agnostic with respect to the platform from which the load is suspended (e.g., the characteristics of a helicopter "ownship", or a crane, etc.), as it independently and dynamically determines thrust necessary to stabilize the load or to direct the load in a desired direction, without producing thrust which might merely destabilize the load. This permits widespread adoption of the system regardless of carrier type, lowering cost and mitigating solution risks.

An SLCS can provide benefits to, for example, helicopter search and rescue, MEDEVAC, sling load operations, forest fire helicopters, crane operations, construction sling load operations, and civilian firefighting.

Control of an SLCS may require determining the position, orientation, and or motion of an SLCS, of the carrier, and or of a load; such information may be referred to herein as "state data", "state information", or "state parameters". A subset of state information may be reported to another system; when so reported, such subset of state information may be referred to as "telemetry data" or "telemetry information". Control of a carrier and or components in a carrier, such as a wench or hoist which may be used in relation to an SLCS, may also be improved with state or telemetry information related to an SLCS, a load, and or of a carrier. An SLCS may be used in contexts in which Global Position System (GPS) or other geolocation or radionavigation systems or other position and orientation systems are unavailable, are compromised, or are subject to latency. Redundancy in state and telemetry information may also be desirable to increase reliability in implementation of control systems and to decrease latency in providing telemetry information to such systems.

Control of an SLCS and a suspended load is different from control of other automated systems, such as cars and unmanned aerial vehicles, at least because an SLCS must dynamically and recursively estimate state information such as mass of SLCS and load, cable length, rotational inertia of SLCS and load, movement, position, and rotation SLCS, and movement, position, and rotation of the carrier, as well as estimating disturbance forces, such as wind force and relative SLCS and carrier motion.

Disclosed herein are one or more apparatuses, systems, and or methods to determine state information, including cable length, mass, position, orientation, and or motion information of an SLCS, a carrier, and or of a load and to provide state information as telemetry data to one or more control apparatuses, systems, and or methods which may be remote from the SLCS. These apparatus, systems, and or methods are capable of determining state information at or by an SLCS, including in contexts in which radionavigation systems or other absolute and relative position and orientation systems are unavailable, are compromised, or are subject to latency or error.

As described further herein, these apparatus, systems, and or methods may integrate machine-vision information with other sensor information, such as from an inertial navigation system and from LIDAR (possibly a portmanteau of "light and radar" or an acronym for "light detection and ranging"), to localize an SLCS relative to a carrier or another object. Machine-vision information may be produced through image capture by cameras in an SLCS and object detection of the carrier and or load in such images; when integrated with information from inertial navigation system and LIDAR systems, localized relative state information (including relative orientation and position of the carrier, load and or SLCS, and separate heading vectors of carrier and SLCS within a localized coordinate system) may be developed with low latency and high reliability. When absolute state information is available, such as from GPS or another radionavigation or absolute positioning system, absolute and relative localized state information may be integrated. Integration of machine-vision information with information from inertial navigation, LIDAR, and or absolute position systems may be performed using methods that comprise, for example, a Kalman Filter, such as an Unscented Kalman Filter ("UKF") and state model.

As discussed, an SLCS and an attached load may rotate and or may have a heading vector which follows a pendular path relative to a carrier's coordinate space. Relative and or absolute state information developed according to the disclosure herein may be used to control or to enhance control of an SLCS or may be provided as telemetry to a carrier or a component within a carrier or to an object or persons on the ground or elsewhere.

As discussed herein, a gain adjustment module of an SLCS may allow the SLCS, including logical and operational components thereof, to respond to changing circumstances of operation of the SLCS, such as changes in the load, changes in disturbance forces, to provide motor response behavior suited to the then-current circumstances and also to allow a target orientation or position to be achieved with reduced self-induced cyclic motion or reduced seeking behavior.

Reference is made to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of crane operations, a helicopter sling load, and or search and rescue operations. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and or" unless the content clearly dictates otherwise.

Reference numbers herein comprising a letter, e.g. thruster 1205A, generally refer to one of a plurality of components, e.g. to thruster 1205A and thruster 1205B; one of or a plurality of components may be referred to with a corresponding reference number, without the letter; e.g. thruster 1205, in which case the reference should be understood to encompass any of the components with the corresponding reference number without the letter. When a top-level component referred to herein comprises a sub-component, e.g. suspended load control system 105 ("SLSCS 105") comprising decision and control module 700 in memory 525 and thruster 1205, a reference to the top-level component may refer to one or more of the sub-components performing functions as described further herein; e.g. a reference to SLCS 105 applying thrust to suspended load 115 may also be understood as SLCS 105 and decision and control module 700 in memory 525, executed by processor 520 and implemented by suspended load control system logical components 501 and operational components 900 to activate thrusters 1205 to apply thrust to suspended load 115.

FIG. 1 through FIG. 4 are discussed herein, for example, above.

Figure 12:
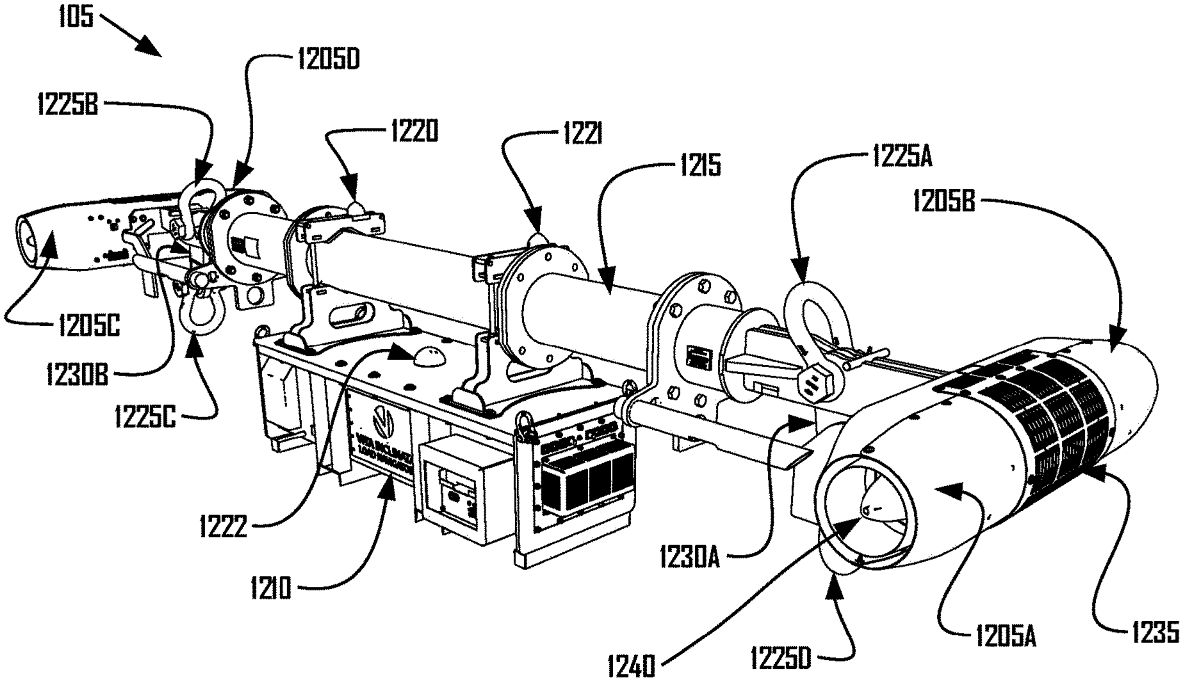
FIG. 12 illustrates a perspective view of an example of an SLCS for heavy lift operations, in accordance with one embodiment.

Referring to FIG. 12, FIG. 12 illustrates SLCS 105 of FIG. 1 through FIG. 4 from a closer vantage. As illustrated in FIG. 12, SLCS 105 may comprise, for example, fan unit 1205A, fan unit 1205B, fan unit 1205C, and fan unit 1205D. More or fewer fan units may be utilized. Fan units may comprise a cowl or shell which protects one or more EDF or other thruster. Flywheels may be used on place or or in addition to fan-based thrusters. The cowl may be hardened, to withstand impact with the environment. The cowl unit may be made of metal, plastics, composite materials, including steel, stainless steel, fiber reinforced resin, and the like. Fan units may include air intake 1235, though which air may be drawn, and outlet 1240. Air intake 1235 may comprise one or more screens or filters to prevent entry of some objects into the fan unit. EDF in a fan unit may comprise blades and motor(s), such as electric motor(s). Electric motors within an EDF may be sealed against dust, sand, water, and debris. As noted, in addition to or in replacement of EDF, alternative sources of thrust may be used, such as, for example, compressed air, hydrogen peroxide jets or thrusters, liquid or solid rocket engines, fans driven by combustion engines, such as jet engines, flywheels, and the like.

For the sake of convenience in discussing them, fan units on a first side of an SLCS, such as fan units 1205A and 1205B may be discussed as a first fan unit group while fan units on a second side, such as fan units 1205C and 1205D, may be discussed as a second fan unit group. The fan units in each fan unit group may propel thrust fluid (such as air) in fixed directions, such as fixed directions opposite each other, e.g. offset by 180 degrees. In other embodiments, a fewer or greater number of fan units and or EDF may be used in an SLCS. In other embodiments, the fan units and or EDF may be aligned other than offset by 180 degrees, e.g., offset by greater or fewer than 180 degrees, with or without offset along other of the axis. A mechanical steering component may be included to dynamically reposition a fan unit and or EDF within a fan unit. In the illustrated example, EDF in fan units 1205 comprise asymmetrical fan blades, which produce more thrust when rotated in a first direction relative to a second direction; in this example, to produce thrust in opposing directions out of one fan unit group, two EDF are contained in each fan unit group, facing opposite directions; e.g. EDF in fan unit 1205A and 1205B each rotated in only one direction and produce thrust "outward", out of each fan unit, in opposite directions. In alternative embodiments, one symmetrical fan may be contained in a fan unit, wherein the one symmetrical fan may be rotated in either direction and produce equivalent thrust in either direction. In alternative embodiments, three fan units may be used, with all three of the fan units orthogonal to one another or with two of the fan units parallel to another (as in FIG. 12) and a third fan unit orthogonal to the first two (not illustrated). In alternative embodiments, four or fan units may be used, with each to the fan units 90 degrees to on another.

EDF (or other thrusters) in individual of the fan units may be activated separately, with different power, to produce thrust vectoring or thrust vector control of an assembly of fan units. For example, to produce clockwise yaw (relative to looking down on a top of SLCS 105 in FIG. 12), an EDF in the first fan unit group, such as fan unit 1205B may be activated by itself or in conjunction with an opposing EDF in the second fan unit group, such as fan unit 1205C. To produce lateral translation of SLCS 105 or to produce lateral force opposing pendular motion, EDF in both fan unit groups with a same orientation may be activated, such as fan units 1205B and 1205D. Simultaneous lateral force and rotational force may be produced.

When an SLCS comprises fewer than three EDF (or equivalent thrusters), then control over pendular motion may require first rotating the SLCS to a first direction, then applying a first horizontal thrust vector out of the EDF to cancel a first decomposed component of the pendular motion, and then, if necessary, rotating the SLCS to a second direction, general orthogonal to the first direction (though disturbances or other variation may cause the second direction to not be orthogonal to the first direction), and then applying a second horizontal thrust vector out of the EDF to cancel a second decomposed component of the pendular motion. Use of three or more EDF may allow control over pendular motion without decomposition of the vector components of pendular motion, though may require more parts.

SLCS 105 may be formed of any suitable material such as metal, plastic, composite materials, such as fiber reinforced resin. A sealed hatch or one or more panels may be removed from an SLSC to allow for maintenance and inspection of enclosed logical components 501 and operational components 900.

Load 115 in FIG. 1 through FIG. 4 may comprise one or more people, a litter, a container, an object, or the like. Load 115 is illustrated as being secured to two points on either side of SLCS 105, such as to bottom shackle 1225C and 1225D, such that load 115 may not easily rotate, independent from SLCS 105, but is more likely to rotate with SLCS 105. A weight of load 115 may change during an operation, such as when all or part of a load is picked up or put down or when a mass falls off of on onto a load. Suspension cable 135 in FIG. 1 through FIG. 4 may be, for example, a braided cable between SLCS 105 and or load 115. A rotational coupling (not numbered), may allow SLCS 105 and load 115 to rotate, without winding up suspension cable 135. Gravitational and other forces from load 115 may be transferred through bottom shackle 1225C and 1225D, into tensile beam 1230A and 1230B, to top shackle 1225A and 1225B, and then to suspension cable(s) 135 (e.g. via a rotational coupling). Tensile beam 1230 may be secured to a spreader bar (not numbered) or other beam between fan units 1205.

SLCS 105 may comprise a cable entry channel (not illustrated), to receive a suspension cable, such as suspension cable 135. Cable entry channel may be angled inward, toward a cable receiving area. Cable receiving area may form a partially enclosed vertical channel between a fixed jaw and a moveable jaw within SLCS 105. SLCS 105 may comprise springs or another force-applying member to apply a compressive force to close a set of jaws on suspension cable 135, within the partially enclosed vertical channel between a fixed jaw and a moveable jaw. Together, the set of jaws may be understood as a “clamp” and may be referred to as a “jaw” or “jaw system”. The jaw system may comprise a fixed jaw and a moveable jaw or a set of levers joined at a fulcrum. The jaw system may hold SLCS 105 on suspension cable 135. The length of suspension cable 135 may change during an operation, effecting behavior of the suspended load and response required by an SLCS.

Figure 9:
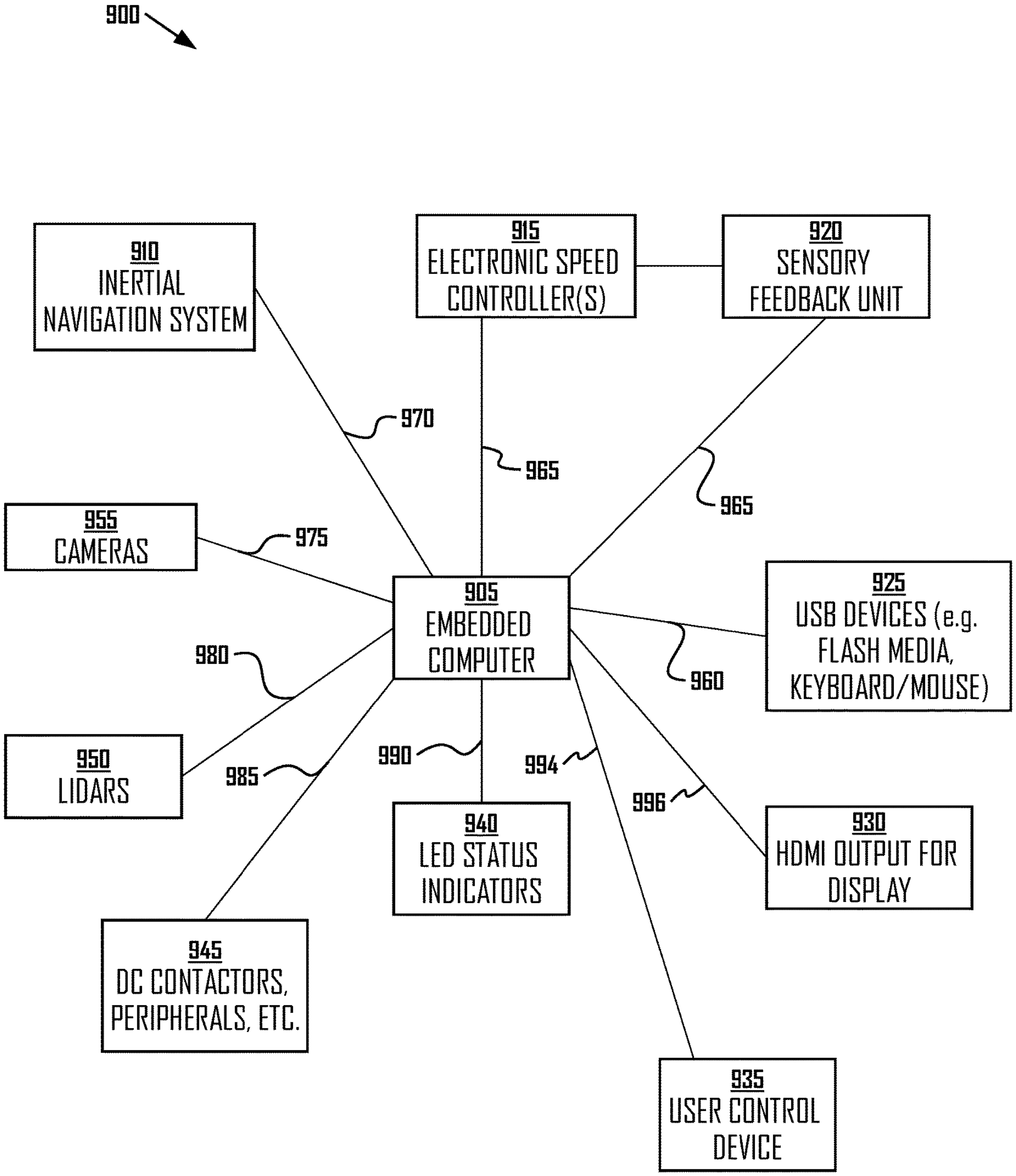
FIG. 9 schematically illustrates electronic computer, hardware, and network connections among operational components of a suspended load control system in accordance with one embodiment.

Status indicators (not illustrated) may be mounted on various surfaces of the SLCS to aid in visibility and operation of the SLCS from above and below. For example, the SLCS may have external lighting, including visible and infrared (IR) LEDs, such as around the perimeter, to assist in identification of edges and orientation of the SLCS. This may allow for improved identification in hard viewing situations such as inclement weather and low. IR LEDs may be visible to humans using night vision goggle and or to machine systems that can detect visible or IR electromagnetic radiation. During operation, both on the interactive display and the system body itself, LED display indicators may show that the system is active and may convey useful information. LEDs may also convey status of systems and or components of the SLCS. An example of LED lights are illustrated in FIG. 9 as LED status indicators 940.

SLCS 105 may contain and protect logical components 501 and operational components 900, such as computer hardware, such as a computer processor and memory, a power supply, electronic speed controllers, microcontrollers, sensors, and the like. Examples of such computer hardware are discussed in relation to FIG. 9.

The power supply within SLCS 105 may be a single power brick or an array of battery cells wired in series and or in parallel, such as lithium-polymer (LiPo) cells. The batteries may be removable for inspection and or to swap discharged and charged batteries. Batteries may be charged while installed in the SLCS (i.e., without having to remove them) via nodes or a wireless charging system on or in an SLCS that connect to a power supply or charging dock. Batteries may include auxiliary battery(ies) to supply a steady supply of power to the processor even if thrusters in fan units draw a relatively large amount of power from main batteries. In embodiments, a carrier from which the SLCS is suspended, such as a helicopter or crane, can provide power through a line extending down the suspension cable to the SLCS. In embodiments, the carrier can provide some power to the SLCS, while the SLCS may obtain other power from an on-board power supply. In various embodiments, the SLCS may be powered by a combination of on-board and remote power. In many environments, all power for the SLCS is contained on board the SLCS, allowing fully autonomous operation without dependence on the availability of external power sources or delivery means.

SLCS 105 may comprise a data link which allows a microcontroller unit or processor to monitor power information including (but not limited to) cell voltage and real-time power dissipation or consumption.

SLCS 105 may comprise one or more computer processors or central processing units (CPUs), such as embedded computer 905, and one or more microcontroller unit (MCUs). In some embodiments, the CPU and MCUs may be mounted to the same printed circuit board (PCB).

SLCS 105 may be made of or comprise a rugged plastic, metal, polymer, or combination thereof, protecting the system from environmental and operational factors such as weather and other operational conditions.

SLCS 105 may contain one or more wireless transceivers, which may comprise separate transmitter(s) and receiver(s), as well as antennas for wireless communication. The transceiver and or wireless antennas may also be mounted to or printed on the same printed circuit board as the processor. The wireless transceivers may comprise access points for Bluetooth, Wi-Fi, microwave, and or radio frequency (RF) transmission and reception. Wireless transceivers may be used to communicate with remote sensors, a remote control unit, a remote positional unit or target node, a remote interface, and the like, as discussed further herein.

As discussed herein, SLCS 105 may contain a vector navigation unit, which may include an inertial measurement unit ("IMU"), also referred to as an orientation measurement system. The IMU provides inertial navigation data to a processor, such as from 3 degree of freedom (3 DoF) accelerometers, gyroscopes, magnometer or magnetometer such as a compass, an inclinometer, a directional encoder, a radio frequency relative bearing system, and gravitational sensors, which may comprise microelectromechanical systems (MEMS) sensors. The IMU may include an integrated processor to provide on-board state estimation that fuses together data from the sensors in the IMU, in which case the IMU may be referred to as an Inertial Navigation System ("INS"). SLCS 105 may comprise or be communicatively coupled to one or more sensors in addition to the IMU. Such additional sensors may comprise, for example, an absolute position measurement system, a proximity sensor, LIDAR sensors and systems (e.g., point, sweeping, rotating, radial, distance, or linear), ultrasonic, and optical sensors such as one or more cameras or infrared (IR) sensors. Proximity sensors may include ground height sensors. The absolute position measurement system may include global positioning system (GPS) sensors. With a processor and memory, the IMU and GPS may also be referred to herein as an INS, such as inertial navigation system 910 of FIG. 9.

Sensors which require a view of a surrounding environment may be placed on or at the surface of SLCS 105. Examples of sensor locations for one or more of the foregoing are illustrated at sensor location 1220, 1221, and 1222 in FIG. 12. Similar sensors and or sensor locations may be on a bottom of SLCS 105. As discussed herein, information from sensors can be used by methods, apparatuses, and or systems to determine state information; the raw data and or determined state information or telemetry data may be provided to remote devices, processes, and humans, such as via wireline or wireless data links.

Additional SLCS sensors may include a strain sensor to gauge load on housings, on EDF(s), on conduits, on an attachment to a suspension cable, or the like. Additional sensors may include a rotational encoder or thruster speed sensor, such as sensory feedback unit 920 in FIG. 9, which may be incremental or absolute, and a shutdown pin presence sensor.

Not illustrated an arm attached to or part of carrier may be used to deploy, reposition, and or retrieve suspension cable 135 and SLCS 105 (such as when carrier is a helicopter). Such an arm may comprise a wench to lower and hoist suspension cable 135 and SLCS 105. Load 115 and SLCS 105 may be offset from a fall-line beneath such an arm. This offset may be due to wind (whether environmental or from a carrier, such as a helicopter), wave or other forces which may have acted on load 115 and or SLCS 105, change in speed of one or both of load 115 and carrier, and the like.

As discussed herein, one or more computers, such as embedded computer 905, applies algorithms to received sensor data to estimate state information and output a desired system response. For example, data from IMU and GPS may be fused together through non-linear data fusion methods, such as real-time kinetic algorithms ("RTK"), Kalman filters, transfer functions, or Kalman filtration methods, such as an Unscented Kalman Filter ("UKF"), or through complimentary filters or transfer function models to yield optimal state estimates in all degrees of freedom to characterize the system's location and motion in relative or absolute coordinate frames, such as an aircraft or crane relative defined frame or in geodetic space.

Figure 5:
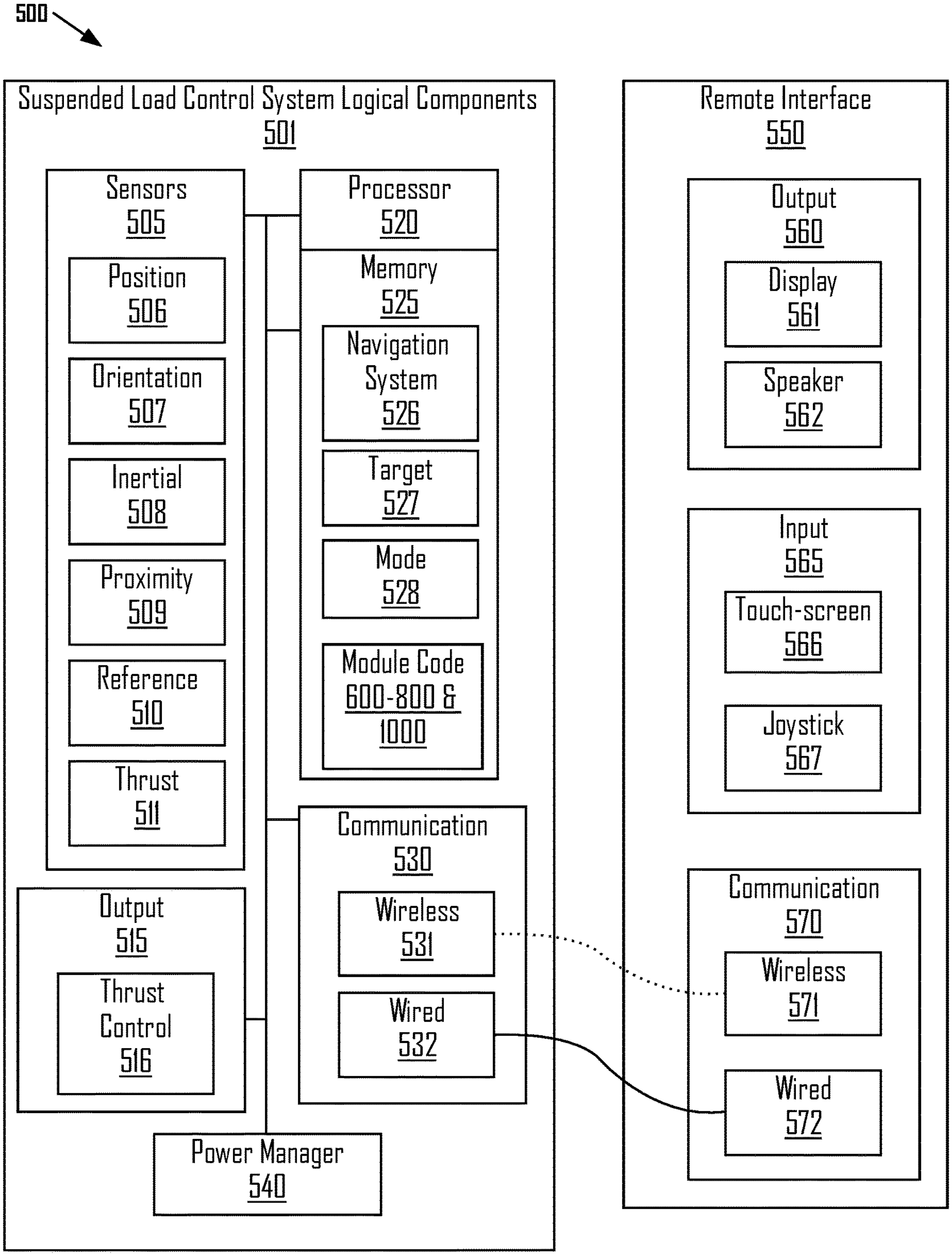
FIG. 5 schematically illustrates an example of an SLCS operational components of a suspended load control system including a remote interface, in accordance with one embodiment.

Examples of components which may be within SLCS 105 and within remote positional sensors or beacons, remote computational units, or target node transceiver devices are discussed further herein, such as in relation to FIG. 5 and FIG. 9.

Carrier 110 in FIG. 1 through FIG. 4 is illustrated as a crane, but represents any carrier.

SLCS 105 and load 115 may follow an oscillation path, e.g. pendular motion of a load which may be cause by movement of and or interaction among carrier 110, load 115, SLCS 105, wind, other external forces, and the like. Load 115 and or SLCS 105 may also rotate or yaw about suspension cable 135. As discussed, such yaw and or pendular motion may cause problems for transport and or recovery of load 115 by carrier 110. SLCS 105 may be able to estimate system information, including such motion, disturbance forces, and reduce or eliminate such undesirable motion through activation of thrusters.

Axes 120 illustrate a coordinate system. The coordinate system may represent, graphically, for the reader of this paper, state information developed by data fusion and telemetry output module 800.

As discussed further herein, data fusion and telemetry output module 800 may perform object recognition to identify carrier 110 and an orientation of carrier 110. Determination of the orientation of carrier 110 325 may allow data fusion and telemetry output module 800 to determine that carrier 110 has a center around which carrier 110 may rotate.

As discussed further herein, data fusion and telemetry output module 800 may also determine a height of carrier 110 above SLCS 105. This determination may be based on one or more of LIDAR, object recognition, optical, IR, or microwave range or distance measurement, including from one or more data sources (such as stereo cameras), using signal time-of-flight information, detection of encoded laser light, orientation, position, and movement information input to a UKF system models, or otherwise. As discussed further herein, data fusion and telemetry output module 800 may also determine a relative offset between SLCS and a slung point on carrier.

Data fusion and telemetry output module 800 may also determine change in the foregoing information over time, allowing data fusion and telemetry output module 800 to determine an oscillation path or pendular motion of SLCS 105 and load 115.

Data fusion and telemetry output module 800 may determine local relative position, orientation, movement over time, change in movement over time of SLCS 105 and carrier 110, mass of SLCS 105 and load 115, distance below carrier (or a slung point on carrier), all from data obtained locally by SLCS 105. Similar local relative state information of load 115 may be developed with information from sensors oriented toward load 115.

As discussed herein, data fusion and telemetry output module 800 or another module may integrate this local relative state information with absolute position information, such as from a GPS or other geolocation or radionavigation systems. In this way, data fusion and telemetry output module 800 may develop critical local and absolute state information of an SLCS, a load, and or a carrier.

As discussed herein, communication systems, such as communication 530 module within SLCS logical components 501, may communicate local and or absolute telemetry information to an interactive display or remote interface of an SLCS or to other systems, such as a control system for a hoist in or coupled to an arm.

FIG. 5 schematically illustrates logical components of SLCS 500 including SLCS logical components 501 and remote interface 550 in accordance with one embodiment.

Referring to FIG. 5, interactive display or remote interface 550 may be a computational unit that can be self-powered or hardwired into an airframe or other carrier or which may be carried by an operator, such as on the ground. Display or remote interface 550 receives data, such as telemetry data, from an SLCS, e.g., wirelessly. The data from the SLCS may be parsed and converted to visual cues or visual information and displayed on display 561.

An example of an embodiment of a user interface (UI) of interactive display or remote interface 550 may represent a location of an SLCS and a load, height or distance of the SLCS below the carrier. As discussed further herein, the length of suspension cable below the carrier may be calculated by, for example, data fusion and telemetry output module 800, based solely on sensor information generated at the SLCS, such as SLCS 105. Such a display or remote interface 550 may further communicate the height or distance of the SLCS and or load above the ground and or may further communicate the absolute position of the carrier and or of the SLCS and or load, such as "LAT: 44.244167 LON: 7.76944".

The interactive display may also communicate an operator's desired command states to an SLCS. Desired command states may be communicated verbally, by touching (including repeated or sustained touch) the interactive display, by dragging objects on the interactive display, by pushing buttons, whether graphical buttons on a touchscreen or physical buttons, by entry of text commands, through a keyboard, and the like.

The interactive display or remote interface 550 is in communication with SLCS logical components 501 via communication systems 570, which may be wireless 571 or wired 572. Output 560 from remote interface 550 may include information displayed on a screen 561, and audio cues 562. Input 565 to remote interface 550 to control the SLCS may include commands conveyed through a touchscreen 566, a joystick 567, a microphone, a camera, button 425, or the like. In various embodiments, remote interface 550 may comprise one or more physical and or logical devices that collectively provide the functions described herein. Another example of an embodiment of remote interface 550 is illustrated and discussed in FIG. 11A, FIG. 11B, and FIG. 11C.

As illustrated in the embodiment illustrated in FIG. 5, within SLCS logical components 501 are sensor suite 505, which may include position sensors 506, orientation sensors 507, inertial sensors 508, proximity sensors 509, reference location sensors 510, and thrust sensors 511. Examples of embodiments of such sensors are discussed further herein, such as in relation to IMU, absolute position measurement systems, and as discussed in relation to FIG. 9, such as inertial navigation system 910, cameras 955, LIDARS 950, DC contactors, peripherals, etc. 945, and sensory feedback unit 920.

SLCS processor 520 may include one or more processor and or microcontrollers. An example of a processor and or microcontroller is embedded computer 905 of FIG. 9.

SLCS memory 525 may generally comprise a random access memory ("RAM"), a read only memory ("ROM"), and a permanent non-transitory mass storage device, such as a disk drive or SDRAM (synchronous dynamic random-access memory).

SLCS memory 525 may store program code for modules and or software routines, such as, for example, navigation system 526, operational module 600, decision and control module 700, data fusion and telemetry output module 800, and gain adjustment module 1000, as well as data or information used by modules and or software routines, such as, for example, target data 527, and mode or command state information 528.

Memory 525 may also store an operating system. These software components may be loaded from a non-transient computer readable storage medium into memory 525 using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via a network interface.

Memory 525 may also comprise a kernel, kernel space, user space, user protected address space, and a datastore.

Memory 525 may store one or more process (i.e., executing software application(s)). Process may be stored in user space. A process may include one or more other process. One or more process may execute generally in parallel, i.e., as a plurality of processes and or a plurality of threads.

Memory 525 may further store an operating system and or kernel. The operating system and or kernel may be stored in kernel space. In some embodiments, the operating system may include a kernel. The operating system and or kernel may attempt to protect kernel space and prevent access by certain of the processes.

The kernel may be configured to provide an interface between user processes and circuitry associated with embedded computer 905. In other words, the kernel may be configured to manage access to embedded computer 905, a chipset, I/O ports and peripheral devices by processes. The kernel may include one or more drivers configured to manage and or communicate with elements of operational components of SLCS 500 and 900 (i.e., embedded computer 905, chipset, I/O ports and peripheral devices).

Processor 520 may also comprise or communicate via a bus and or a network interface with memory 525 or another datastore. In various embodiments, such a bus may comprise a high-speed serial bus, and a network interface may be coupled to a storage area network ("SAN"), a high speed wired or wireless network, and or via other suitable communication technology.

SLCS logical components 501 may, in some embodiments, include many more components than as illustrated. However, it is not necessary that all components be shown in order to disclose an illustrative embodiment.

The data groups used by modules or routines in memory 525 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Communication system(s) 530 may include wireless system(s) 531 such as the wireless transceiver, and wired system(s) 532. SLCS output 515 includes thrust control 516 via thruster controllers. Power managing systems 540 regulate and distribute the power supply from, e.g., the batteries or remote power supply. One or more data connectors, data buses, and or network interfaces may connects the various internal systems and logical components of the SLCS. Examples of data connectors and or data bus are illustrated in FIG. 9, at data connector elements 965 to 996.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from an SLCS may be of very low bandwidth and may not be restricted to a frequency or communication protocol. In a distributed computing environment, modules can be located in both local and remote memory storage devices. As schematically illustrated in FIG. 5, SLCS logical components 501 and remote display interface 550 may be connected by wired or wireless networks.

An SLCS may work with a remote positional unit or target node of a suspended load control system in accordance with one embodiment. The remote positional unit or target node may comprise an external sensor suite or beacon configured to communicate, such as wirelessly, with the SLCS as a positional reference. If the SLCS is considered the primary sensor suite, a secondary sensor suite location can be the platform or carrier from which the cable is suspended, and a tertiary sensor suite location can be a location of interest for the load (e.g., for positioning to obtain or deliver the load).

A remote positional unit can include a positional transceiver configured to communicate with the SLCS via its wireless transceiver and provide a positional reference. For example, a remote positional unit can be attached to a helicopter ownship or crane below which a load may be suspended.

In some embodiments, the remote positional unit or target node may be made of durable polymer or plastic, large enough to fit into a hand. The remote positional unit or target node may have an external antenna. The remote positional unit or target node may be attached to, e.g., the crane or helicopter by magnets, bolts, or any other attachment mechanism. The remote positional unit or target node may be dropped to a location on the ground or attached to, e.g., a life preserver or other flotational device, a rescuer, a load to be picked up, a location for a load to be delivered, or an operational specific location.

Aspects of the system can be embodied in a specialized or special purpose computing device or data processor that is specifically programmed, configured, or constructed to perform one or more of the computer-executable instructions explained in detail herein, such as embedded computer 905. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 5, SLCS logical components 501 and remote display interface 550 are connected by a wired or wireless network.

Figure 6:
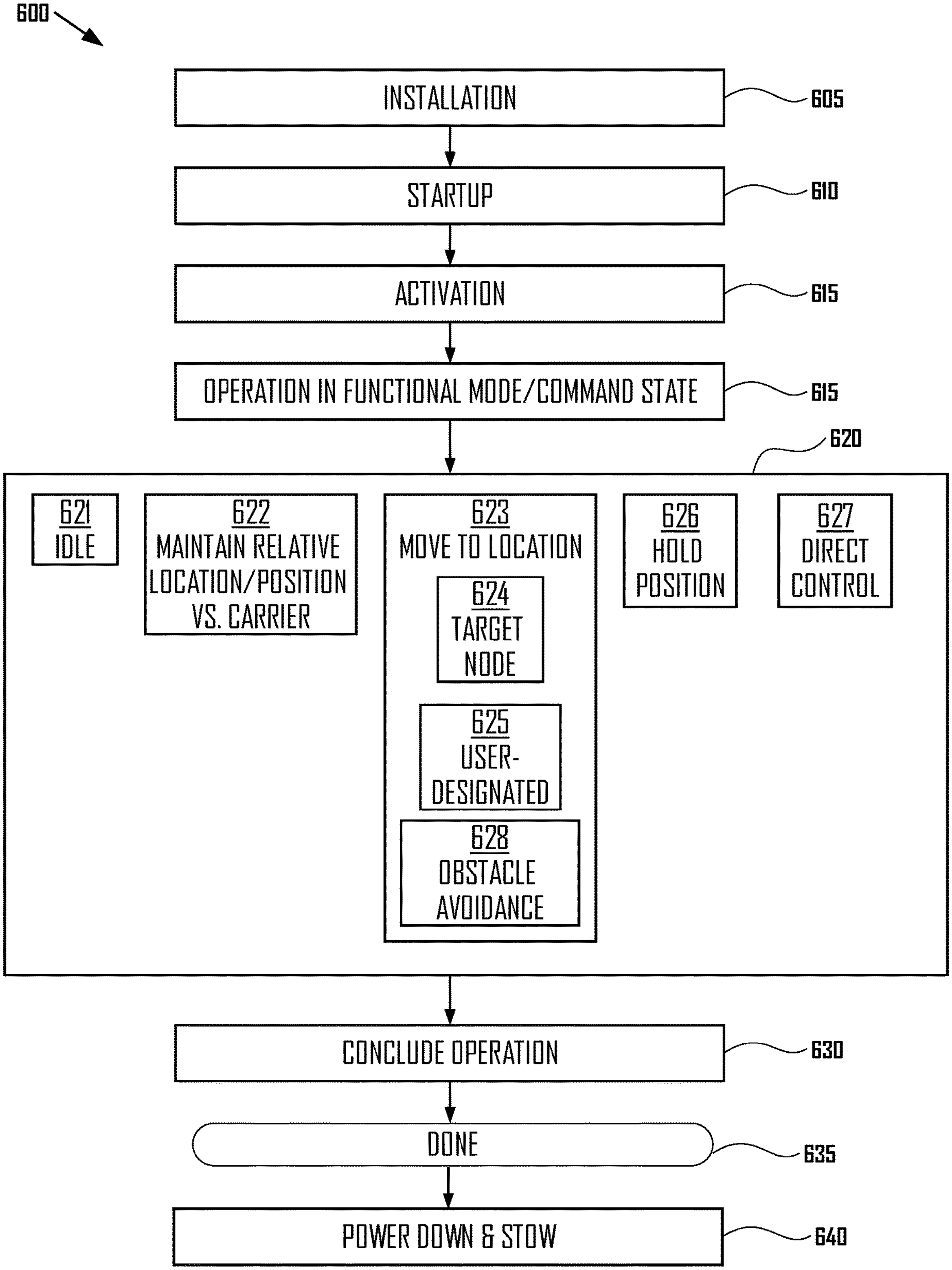
FIG. 6 illustrates an operational module of a suspended load control system including multiple modes or command states in accordance with one embodiment.

FIG. 6 illustrates an operational module 600 of a suspended load control system ("SLCS") including multiple modes or command states in accordance with one embodiment. Instructions of, or which embody, decision and operational module 600 may be stored in, for example, memory 525, and may be executed or performed by, for example, processor 520, as well as by electrical circuits, firmware, and other computer and logical hardware of SLCS with which operational module 600 may interact. In embodiments, computer processors and memory to perform some or all of operational module 600 may be remote from SLCS, such as in an auxiliary computer in, for example, a carrier.

In block 605, the SLCS apparatus may be installed onto a load and or cable from which the load will be suspended. The SLCS apparatus need not be powered for installation.

In block 610, the SLCS in the apparatus may be started up and operational module 600 activated, if it is not already operating. In some embodiments, operational module 600 may be initialized by the press of a button or turn of a key located on the SLCS. Near the accessible external button or key which may initialize operational module 600, another button may be present that allows for immediate system shut down when pressed. In addition to the initialization interface, operational module 600 may be initialized by an operator not directly next to the system. One or more external operators, including but not limited to an operator on the ground or at the end of the cable, may initialize operational module 600 by pressing a button on one or more interactive displays 650 linked wirelessly to operational module 600.

One or more modules or components of a complete SLCS, such as physically separated control unit, fan unit, and the like, may be started up in block 610 and may be paired to function together. During block 610, operational module 600 may determine a relative orientation of fan units which operational module 600 is to control. This determination may be based on sensor information from the fan units, such as a compass heading sampled from each fan unit. This determination may be performed to adjust for fan units which are not parallel to one another, as may be the case when a modular SLCS is deployed on an irregular load, such as a rope or webbing enclosed load, and the fan units may not be parallel. This determination may be used in, for example, block 745, with respect to fan mapping and determination of an actuator mix. This determination may not be necessary when the SLCS is in a rigid frame and the fan units may be presumed to be, for example, parallel to one another. This determination may produce an error condition if the fan units are not within an acceptable orientation range.

In block 615, operational module 600 is activated in and or receives a functional mode or command state selected by the operator.

In block 620 and a functional mode or command state, operational module 600 may perform or call suspended load control decision and control module 700 as a subroutine or submodule, to implement a functional mode or command state. The functional modes or command states of the system are and perform the following:

Idle mode 621: all internal systems of the SLCS are operating (e.g., operational module 600 observes motion of the SLCS and calculates corrective action), but thrusters are shut off or maintain an idle speed only, without action to affect the motion of the load.

Maintain relative position relative to carrier mode 622: stabilizes the SLCS with respect to a slung origin point. For example, when the SLCS is suspended with a load below an arm of a helicopter or a trolley on a crane, the SLCS will stay directly below the arm or trolley. Maintain relative position relative to carrier mode 622 localizes the carrier motion and performs the corrective actions necessary to critically damp any other suspended load motion. If the carrier is traveling at a low speed, maintain relative position relative to carrier mode 622 will couple the velocity so the two entities move in unison. Upon a disturbance to the load, maintain relative position relative to carrier mode 622 provides thrust in the direction of the disturbance to counteract the disturbance, eliminating the swing.

Move to/stop at position mode 623: will stabilize an SLCS to a fixed position, counteracting the influence of the weather or small movements of the carrier. This mode has the effect of trying to eliminate all motion. The operator may send a desired target position to the SLCS via the remote interface 650. This may be accomplished in at least two ways:

Target node position 624: The operator may place an SLCS remote positional unit or target node 510 at the desired lowering location. The target node 510 will communicate wirelessly with the SLCS to indicate the desired position, and the SLCS responds by maneuvering to the desired location. The remote interface 550 UI may receive and display the location information of both entities.

User-designated position 625: The operator may use remote interface 550 UI to send a designated position (e.g., latitude and longitude coordinates) as a commanded location to the SLCS. The system will then steadily direct the suspended load toward the desired position. The system will simultaneously send feedback to the remote interface 550 UI regarding position and distance information.

Hold Position mode 626: will resist all motion of an SLCS and maintain current position and or orientation independent of the carrier's motion. This mode has the effect of eliminating or dampening all motion. This mode has conditional responses respectively to carrier speed, safety factors, and physical constraints.

Direct control mode 627: Joystick operation of the SLCS in three degrees of freedom. Though operational module 600 is entirely closed-loop and does not require external control during operation, there may be an option for user control. The operator may be able to directly control positioning, rotation, and thruster output level.

Obstacle avoidance module 628 module: receives and processes sensor information such as to i) to equalize the distance between sensor locations, such as at fan units and objects, such as obstacles, sensed in the environment or ii) to measure or receive geometry of a load, measure geometry of obstacles sensed in the environment, determine or receive the position, orientation, and motion of the load, and negotiate the load relative to the obstacle.

In block 630, the operator may complete the operation and retrieves the SLCS apparatus.

In done block 635, operational module 600 may be shut down, such as by an interrupt condition, such as by pushing a button on the interactive display or by pressing a button on the center module itself. At done block 635, operational module 600 may exit or return to another process.

At block 640, if the SLCS apparatus includes collapsible propulsion arms or the like, they can be folded up. The load may be detached from a load hook or bottom shackle 1225C and or 1225D and the SLCS apparatus may be removed from the suspension cable, such as by being detached from hoist ring or top shackle 1225B and or 1225A. The SLCS may then be connected to a charger, stowed, or the like.

Figure 7:
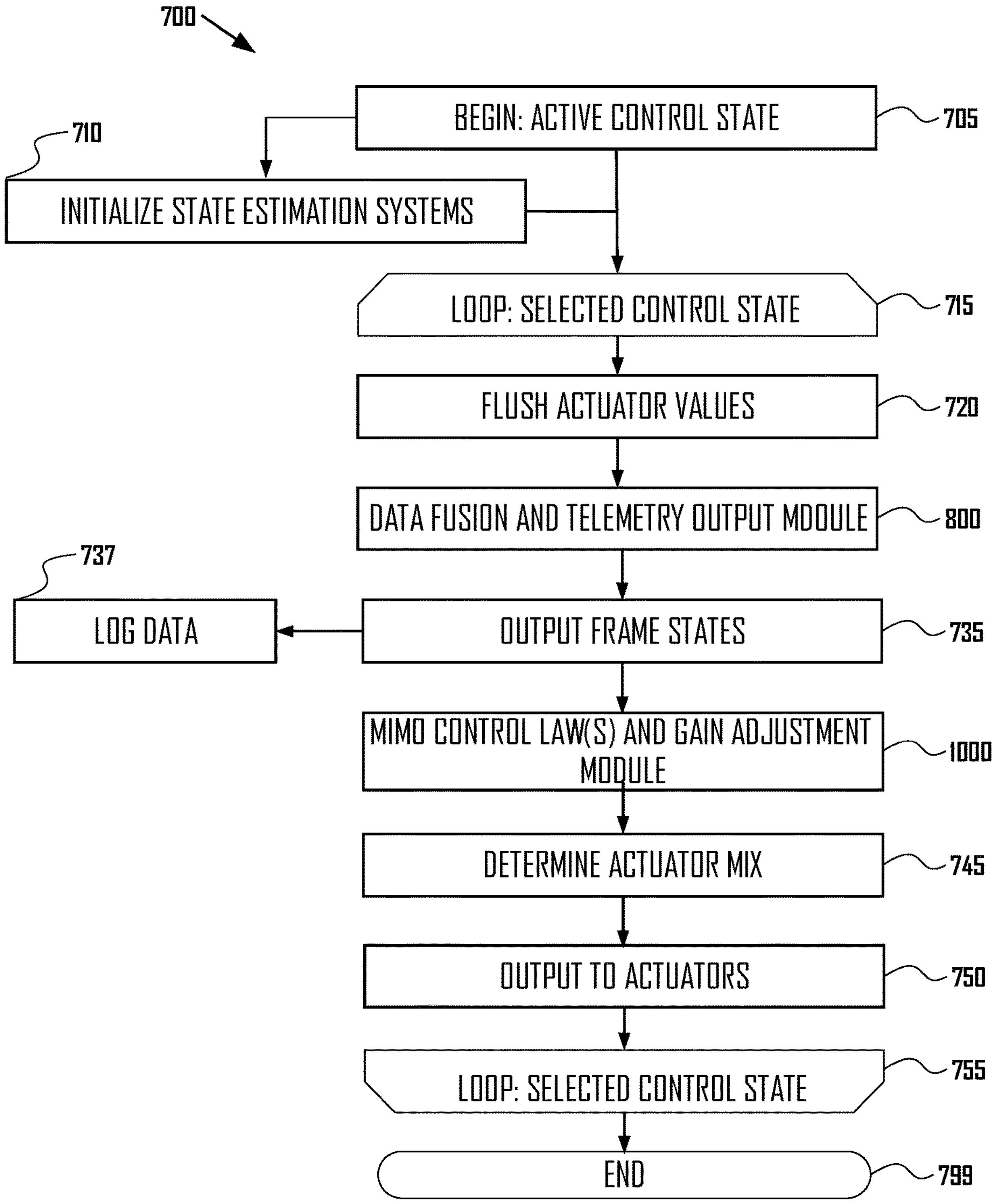
FIG. 7 illustrates a decision and control module of a suspended load control system in accordance with one embodiment.

FIG. 7 illustrates decision and control module 700 of an SLCS in accordance with one embodiment. Instructions of, or which embody, decision and control module 700 may be stored in, for example, memory 525, and may be executed or performed by, for example, processor 520, as well as by electrical circuits, firmware, and other computer and logical hardware of SLCS with which decision and control module 700 may interact. In embodiments, computer processors and memory to perform some or all of decision and control module 700 may be remote from SLCS, such as in an auxiliary computer in, for example, a carrier.

Decision and control module 700 may operate in a loop to develop relative and absolute telemetry information, send this data to remote locations, perform a set of calculations to determine the most desired response, then send the desired response to the air propulsion thruster array, for example, to mitigate pendular motion or swing of the cable and suspended load, rotation of the SLCS and suspended load, or otherwise control a suspended load during operations. This process may operate in a continuous loop as long as the system is powered on and a suitable command state is active. This process may operate with data received only from sensors in an SLCS, such as SLCS 105.

In block 705, an SLCS has been deployed, such as onto a suspension cable, has been activated, and decision and control module 700 begins active control state, such as upon being powered on, initialized, or otherwise commanded, either by a user or another process, such as operational module 600. At block 710, if newly activated, decision and control module 700 initializes state estimation systems.

Begin loop block 715 to closing loop block 755 iterate over a command state, such as one selected in block 620 of operational module 600.

In block 720, decision and control module 700 may flush actuator values, e.g. values sent to actuators, such as EDFs. This may ensure that old values do not contaminate a then-current process loop.

Figure 8:
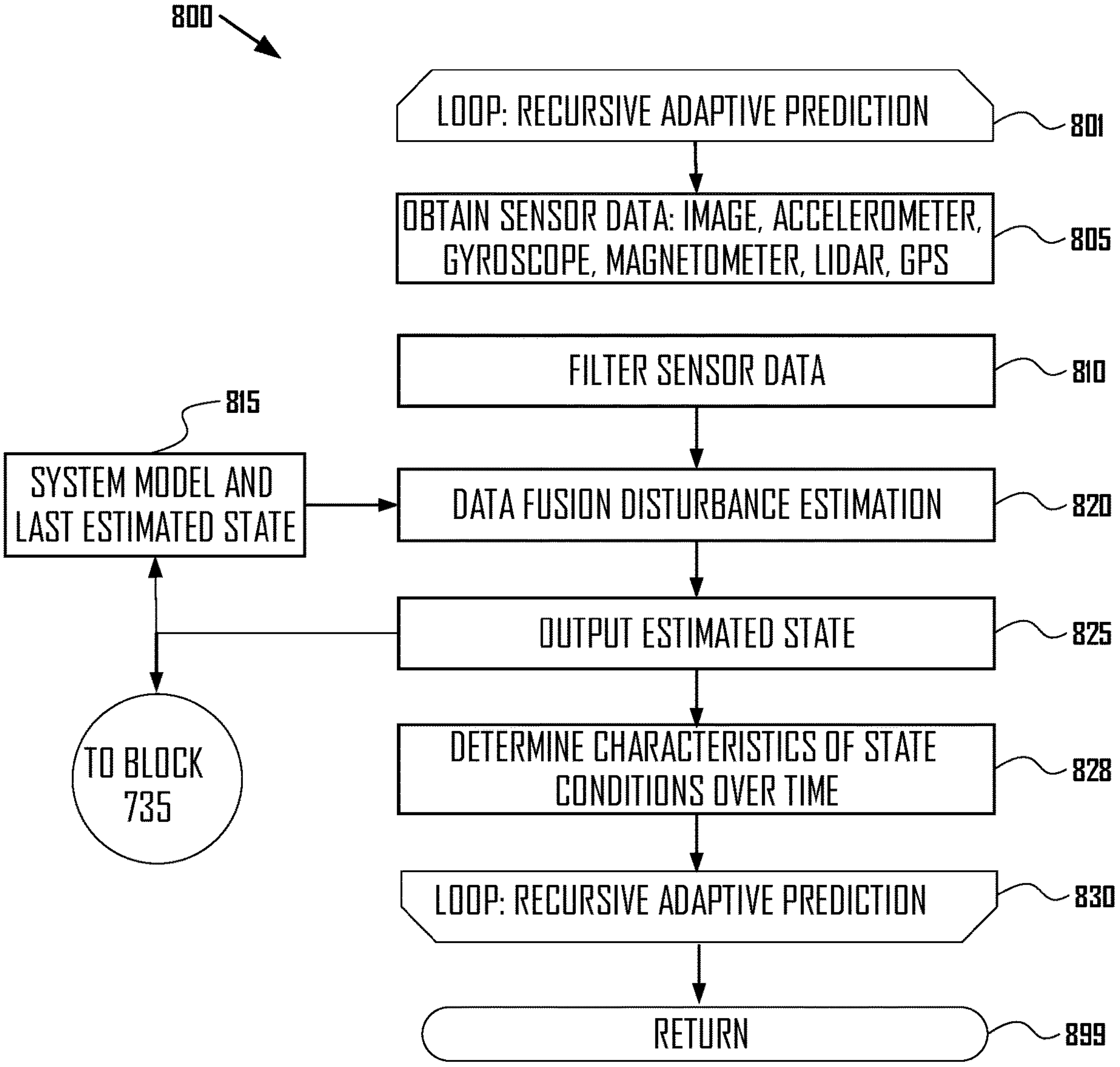
FIG. 8 illustrates a data fusion and telemetry output module, in accordance with one embodiment.

At block 800, decision and control module 700 may enter data fusion and telemetry output module 800, discussed further in relation to FIG. 8. In overview, data fusion and telemetry output module 800 fuses local motion-based and absolute sensor information to create a deterministic state estimation of state data of the SLCS and carrier coordinate frame. An example is discussed in relation to FIG. 3. In overview, data fusion and telemetry output module 800 is updated with most recent values from the sensory suite onboard the SLCS. These values may be obtained in a separate process thread, separate from data fusion and telemetry output module 800. The measurements are passed to state estimation algorithms, in which data fusion and non-linear state estimation is implemented. Please see, for example, data fusion and telemetry output module 800.

At block 735, decision and control module 700 may output updated frame states, which may be logged at block 737.

At block 1000, decision and control module 700 may pass the updated frame states of block 735 to multi-input multi-output ("MIMO") control laws and gain adjustment module 1000. The MIMO control laws may determine an optimal, quantified, correction force based on weighting of severity of current states, and decides how the SLCS should move or exert force, e.g. a thrust control signal, to achieve the determined thrust and orientation of the SLCS set by the user-selected functional mode or command state. For example, weighted control laws may include proportional integral derivation ("PID") with respect to both position and motion. Between the two, severity of motion may dominate relative to position. Control methods weighing cost in terms of energy use may also be considered, as well as additional feedback from past output control to actuators 750.

Gain adjustment module 1000 may adjust a gain of the thrust control signal, to thereby dynamically adapt control of torque or lateral thrust to adapt to changing circumstances, such as a change in the mass or rotational inertia of a load, changes in disturbance forces, to allow an operator to control an SLCS and a load under changing circumstances, to reduce self-induced cyclic motion, to decrease time required to obtain a target orientation, to reduce energy used to obtain or maintain the target orientation, and the like.

At block 745, determination of actuator mix may be determined, e.g. which thruster to activate and how much. This may be determined according to a matrix which receives vectors from the MIMO control laws and determines corresponding actuator values. Net thrust output is mapped in real-time through encoders and load cells.

At block 750, decision and control module 700 may output instructions to the actuators to activate them according to the actuator mix determined in block 745. The result may implement a dynamic response in the form of thrust counteracting unwanted motion or thrust to achieve a desired motion.

In closing loop block 755, decision and control module 700 may return to opening loop block to continue iterating over the then-current command state until an exit condition occurs. Exit conditions may include, for example, achieving an objective, such as obtaining or becoming proximate to a location, obtaining a location for a period of time, obtaining a location and receiving an acknowledgment signal, occurrence of an error, or receiving an instruction to exit.

At end block 799, decision and control module 700 may exit or return to another process. The process may be unmanned and automated aside from the high-level operator-selected functional control modes. The net output is a force to control or stabilize a suspended load.

FIG. 8 illustrates data fusion and telemetry output module 800, in accordance with one embodiment. Instructions of, or which embody, data fusion and telemetry output module 800 may be stored in, for example, memory 525, and may be executed or performed by, for example, processor 520, as well as by electrical circuits, firmware, and other computer and logical hardware of SLCS with which data fusion and telemetry output module 800 may interact. In embodiments, computer processors and memory to perform some or all of data fusion and telemetry output module 800 may be remote from SLCS, such as in an auxiliary computer in, for example, a carrier.

In data fusion and telemetry output module 800, local motion-based sensor and absolute position sensor information is fused to create a deterministic state estimation in a coordinate frame of an SLCS and carrier. An example of a data fusion and disturbance estimation algorithm is an Unscented Kalman Filter ("UKF"). The UKF fuses data sources from multiple measurement devices with a nonlinear numerical model to yield a representative state of the coordinate frame of SLCS and carrier. When performed over time, integrals of subsequent representative states may be used to identify rotational and pendular motion, such as rotation of an SLCS about a suspension cable and an oscillation path of an SLCS, such as oscillation path 237.

Kalman filters produce a predicted future state based a past state and a joint probability distribution of a series of measured values in a timespan; the values often contain statistical noise and other inaccuracies. Past values may be discarded and the predicted state then compared to new measured values to produce a new predicted future state. However, Kalman filters may be limited to linear systems. For nonlinear systems, in which non-linearity occurs in either or both the process model or observation model, a Kalman filter may provide poor performance when covariance is propagated through linearization of the underlying non-linear model(s). To address this, an adaptive model may be used, such as an Unscented Kalman Filters ("UKF"), UKF use a deterministic sampling technique, unscented transformation, to pick a minimal set of sample points, which may be referred to as sigma points, around a mean. The sigma points are then propagated through the non-linear functions, from which a new mean and covariance estimate is formed.

An adaptive system model, such as a UKF, may then recursively estimate varying parameters of the then-current system model, including mass of SLCS and load, cable length, rotational inertia of SLCS and load, movement, position, and rotation of the SLCS and load, and movement, position, and rotation of the carrier. Inertial based measurements are sent to disturbance estimator matrices of a filter, from which wind force and relative SLCS and helicopter motion may be estimated. These state parameters of the adaptive system model may not be "hard-wired" into data fusion and telemetry output module 800, but may be dynamically determined by data fusion and telemetry output module 800. For example, when a load comprises only an empty litter weighing thirty-five pounds, the estimated mass of SLCS and load is much less than when the litter is holding a person who weighs two-hundred pounds. The behavior of an SLCS in activating the fans to deal with the dynamic behavior of the lighter load is very different than the behavior of the SLCS to deal with the heavier load and, generally, involves lighter fan actuation. If it did not, and if the SLCS were not able to dynamically determine the mass of the SLCS and load and the other state parameters, the SCLS would not be able to control the lighter load, but may "overdrive" it and make control of the suspended load less likely. If the SLCS were not able to dynamically determine the mass of the SLCS and load, the other state parameters, and the disturbances, the SLCS would not be able to transition from controlling an unweighted litter to controlling a litter containing a person, as occurs during use of an SLCS. Similarly, the estimated length of the cable and or of inertia has a large effect on pendular motion and how to control it. Systems addressed to control of autonomous vehicles are not known to include system models as described herein, which include continuous and dynamic determination of parameters such as mass of SLCS and load, cable length, rotational inertia of SLCS and load, movement, position, and rotation SLCS, movement, position, and rotation of the carrier, and disturbance estimations of wind force and relative SLCS and helicopter motion.

Other closed-loop control methods including fuzzy-tuned proportional, integral, and derivative feedback controllers with bidirectional communication and control methods including deep learning neural nets.

At opening loop block 801 through closing loop block 830, data fusion and telemetry output module 800 estimates a state of a coordinate system based on measured sensor values, iteratively determines a new estimated future state based on new measured values, and performs an integral of successive state values to identify rotation and pendular motion.

At block 805, data fusion and telemetry output module 800 obtains sensor data, such as image data, accelerometer, gyroscopic, magnetometer, LIDAR, and, if available, GPS data. Image data may comprise object detection, such as detection of a helicopter or other carrier, as well as components of such an object, such as identification of a cabin and tail. Examples of this are discussed in relation to FIG. 3. Image data and object detection may also comprise identification of optical flow of such images or pixels in successive frames. Accelerometer data may comprise 3-degree of freedom ("3 DoF") acceleration data in a sensor coordinate frame. Gyroscope data may comprise 3 DoF angular acceleration data in the sensor coordinate frame. Magnetometer data may comprise 3 Degree of Freedom ("DoF") magnetic field data in the sensor coordinate frame. LIDAR data may comprise point, sweep, rotating, radial, distance, and or linear data which measures distance and or angle relative to objects, the ground, and or water.

At block 810, data fusion and telemetry output module 800 may filter the sensor data, such as to eliminate values which are errors or outside of an allowed range in both time and frequency domains. For example, values not consistent with a sample time range or not consistent with relevant frequencies may be filtered out. For example, suspension cables may be subject to oscillatory and vibratory frequencies; some of such frequencies may be longer than a plausible length of the suspension cable, may be present in sensor data, and may be filtered out.

At block 815, data fusion and telemetry output module 800 may feed the system model and its past estimated or initialization state fed to the data fusion disturbance estimate model, such as into a system model in a UKF, to be fused with then-current sensor data. As noted, the UKF and system model may include, and may therefore determine as an estimated state, one or more of a mass of load and SLCS, a cable length, a rotational inertia of load and SLCS, a fan and actuation force of the SLCS, rotational motion of the SLCS, pendular motion of the SLCS, and movement of a carrier and or of a load over time through an absolute coordinate space.

At block 820, data fusion and telemetry output module 800 may determine a new then-current estimated state, based on the system model, last estimated state, and the then-current sensor data. Inertial based measurements are sent to disturbance estimator matrices of a filter, from which wind force and relative SLCS and helicopter motion may be estimated.

Estimation of state conditions, such as mass of load and SLCS, cable length, rotational inertia of load and SLCS, fan and actuation forces of the SLCS, rotational motion of the SLCS, pendular motion of the SLCS, and movement of a carrier and or load over time through an absolute coordinate space and disturbance estimations, such as wind force and relative SLCS and carrier motion are not know to be practiced by previous control systems for unmanned vehicles.

At block 825, data fusion and telemetry output module 800 may output the then-current estimated state. This may be output to, for example, a record accessed by block 735 of decision and control module 700 and or to a record accessed by block 815 to be fed into the next iteration, if any, of the data fusion disturbance estimate model.

At block 828, data fusion and telemetry output module 800 may determine characteristics of state conditions over time, such as rotation or pendular motion of SLCS, movement of a carrier over time through an absolute coordinate space, and the like. Such characteristics may be determined by determining integrals of such state conditions over time.

At closing loop block 830, data fusion and telemetry output module 800 may return to opening loop block 801, unless or until an exit condition occurs.

At end block 899, data fusion and telemetry output module 800 may exit or return to another process.

FIG. 9 schematically illustrates electronic computer, hardware, and network connections among operational components 900 of a suspended load control system, according with one embodiment. Operational components 900 may be understood as implementing SLCS logical components 501.

Embedded computer 905 may be a computer processor or central processing unit (CPU). The processor may be an embedded system including a signal board computer and one or more microcontroller units ("MCUs"). The CPU and MCUs may be contained within a housing in which data link and electrical connections may be made, such as connections 960 through 994. Embedded computer 905 may comprise computer memory, such as SLCS memory 525.

Connection 970, which may be a serial data connection, may connect embedded computer 905 with inertial navigation system 910. Inertial navigation system 910 may comprise the IMS and GPS, discussed herein.

Connection 975, which may be a gigabit ethernet data connection, may connect embedded computer 905 with one or more optical sensors 955, such as visible light, IR, and other cameras, as discussed herein.

Connection 980, which may be a UDP over gigabit ethernet data connection, may connect embedded computer 905 with one or more LIDAR 950 systems, as discussed herein.

Connection 985, which may be a general purpose, input-output connection, may connect embedded computer 905 with one or more DC contactors, peripherals 945, and the like.

Connection 990, which may be a pulse width modulated electrical connection, may connect embedded computer 905 with one or more LED status indicators 940.

Connection 994, which may be WiFi or wired ethernet UDP/TCP data connection, may connect embedded computer 905 with one or more user control devices 935, such as interactive display or remote interface 550.

Connection 996, which may be an HDMI data connection, may connect embedded computer 905 with one or more HDMI output display devices 930.

Connection 960, which may be a USB data and electrical connection, may connect embedded computer 905 with one or more USB devices 925.

Connections 965, which may form a CAN data bus, may connect embedded computer 905 with one or more electronic speed controllers 915 and one or more sensory feedback units 920. ESC 915 may be a thruster controller to allow embedded computer 905 to control the speed, power draw, and thrust of thrusters in the EDF. An ESC may have the following connections: to the power supply, to a thruster, and to the processor, such as embedded computer 905, to a microcontroller, and or to sensory feedback units 920. ESC pulls power from the power supply and allocates it to the thrusters to control the amount of thrust produced by EDF.

Figure 10:
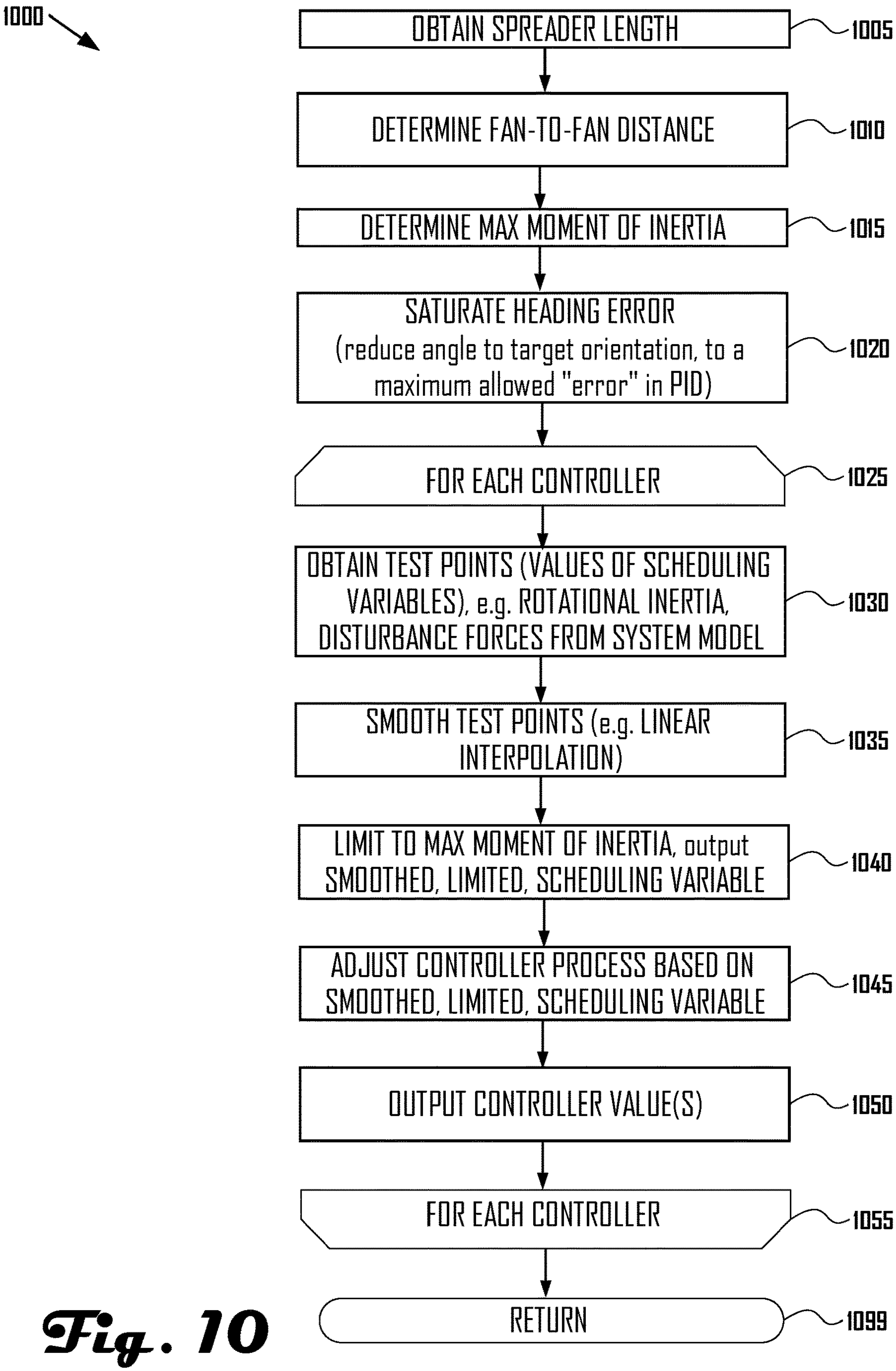
FIG. 10 illustrates a gain adjustment module, in accordance with one embodiment.

FIG. 10 illustrates gain adjustment module 1000 of an SLCS in accordance with one embodiment. Instructions of, or which embody, gain adjustment module 1000 may be stored in, for example, memory 525, and may be executed or performed by, for example, processor 520, as well as by electrical circuits, firmware, and other computer and logical hardware of SLCS with which gain adjustment module 1000 may interact. In embodiments, computer processors and memory to perform some or all of gain adjustment module

1000 may be remote from SLCS, such as in an auxiliary computer in, for example, a carrier.

At block 1005, gain adjustment module 1000 may obtain a spreader length, e.g. a length of a spreader bar or other measure of a distance between thrusters, such as EDF. The spreader length may be input by a user.

At block 1010, gain adjustment module 1000 may determine a thruster-to-thruster distance, for example, based on the spreader length of block 1005.

At block 1015, gain adjustment module 1000 may determine a maximum inertia which may be achieved, for example, based on the spreader length.

At block 1020, gain adjustment module 1000 may saturate or limit a heading error. The heading error may be a difference between a current orientation and a target orientation. The difference between the current orientation and the target orientation may also be referred to as an error or a heading error. For example, if the error is 150 degrees, block 1020 may limit this to 45 degrees.

Opening loop block 1025 to closing loop block 1055 may iterate over each of several controllers in a control loop of gain adjustment module 1000. For example, if the control loop comprises a closed loop, including a PID loop, including a PID loop organized in a cascade control architecture, then the PID loop may comprise a proportional-based response to the error, an integral-based response to the error, and a derivative-based response to the error; each of the proportional-based response to the error, the integral-based response to the error, and the derivative-based response to the error may be referred to as a "controller", such as in opening loop block 1025 to closing loop block 1055. A proportionate controller may control an actuator in proportion to the error. An integral controller may control the actuator according the amount of time the error has been at or near a value. A derivative controller may control an actuator according to a rate of change of the error over time. In a closed PID loop, output of each of the controllers may be summed to produce one output.

However, due to problems such as changing circumstances and seeking behavior, operation of the controllers may be adjusted by gain adjustment module 1000 or a similar module. In the example illustrated in gain adjustment module 1000, at block 1030 gain adjustment module 1000 may obtain test points or values of scheduling variables. For example, at differing values of test points (or differing values of scheduling variables) which may obtain at differing times during operation (such as when first starting toward a target orientation, when nearing a target orientation, when keeping a target orientation), gain adjustment module 1000 may adjust operation of a controller. For example, the test points may be one or more or a composite of a rotational inertia of the SLCS and load and disturbance forces on the SLCS and load.

At block 1035, gain adjustment module 1000 may smooth the test points, e.g. through linear interpolation or the like.

At block 1040, gain adjustment module 1000 may limit the test points, e.g. to the maximum moment of inertia of block 1015.

At block 1045, gain adjustment module 1000 may adjust the controller process based on the smoothed, limited, scheduling test point variable. This may cause each of the controller processes to produce an increased, decreased, or the same output value that the controller process would have output, without operation of gain adjustment module 1000. The change, based on the value of the test point, may thereby produce changes or adjustments to gain of a thrust control signal, in response to then-current and dynamic circumstances, changes in the load, disturbance forces, and the like.

At block 1050, gain adjustment module 1000 may output the controller values determined at block 1045, e.g. into decision and control module 700.

At closing loop block 1055, gain adjustment module 1000 may return to opening loop block 1025 to iterate over the controllers and over future instances in time.

At done block 1955, gain adjustment module 1000 may conclude and or return to a process which may have called it.

Figure 11A:
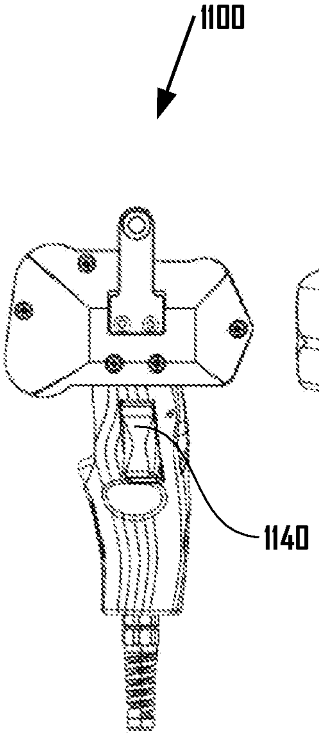
FIG. 11A illustrates back view of a remote interface of an SLCS, in accordance with one embodiment.
Figure 11B:
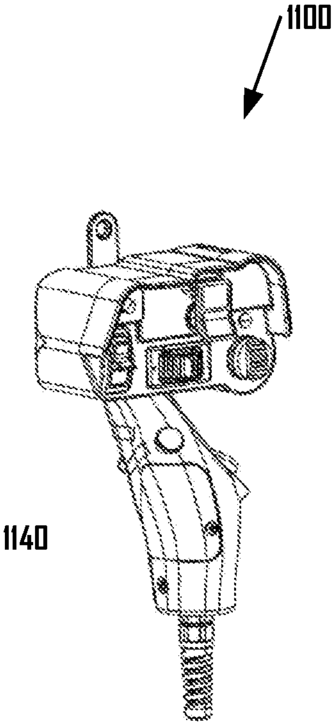
FIG. 11B illustrates an oblique view of the remote interface of the SLCS of FIG. 11A, in accordance with one embodiment.
Figure 11C:
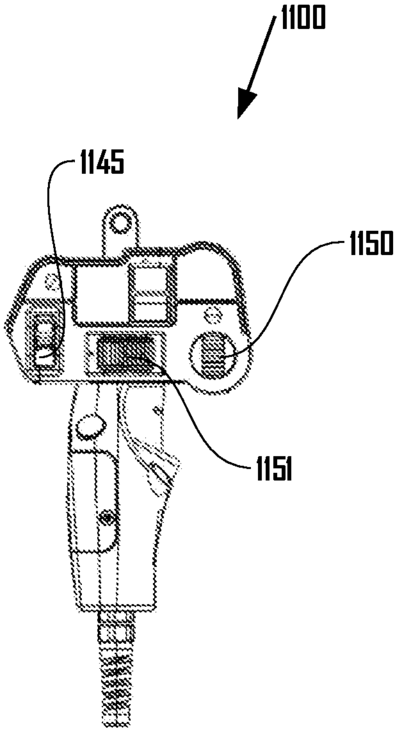
FIG. 11C illustrates front view the remote interface of the SLCS of FIG. 11A, in accordance with one embodiment.

FIG. 11A illustrates an embodiment of a remote interface or remote pendant 1100. FIG. 11B illustrates another view of an embodiment of remote pendant 1100, such as an oblique view. FIG. 11C illustrates another view of an embodiment of remote pendant 1100, such as a front view. Remote pendant 1100 may comprise, for example, on/off switch 1145, state selector 1150, and manual/rotational control 1151. On/off switch 1145 may be used to turn on remote pendant 1100. State selector 1150 may be used to select a command state of operational module 600, as may be discussed in relation to FIG. 6. Activation controller 1140 may be used to activate or deactivate an SLCS in or relative to a selected command state. Manual/rotational control 1151 may be used to manually activate fans to rotate or translate a load when, for example, state selector 1150 has been used to select, for example, direct control mode 627. A joystick may be incorporated into remote pendant 1100, such as in replacement of or in addition to manual control 1151.

Although specific embodiments have been illustrated and described herein, it will be appreciated by those of ordinary skill in the art that alternate and or equivalent implementations may be substituted for the specific embodiments shown and described without departing from the scope of the present disclosure. For example, although various embodiments are described above in terms of a helicopter ownship, in other embodiments an SLCS may be employed under a construction crane or gantry. This application is intended to cover any adaptations or variations of the embodiments discussed herein.

Embodiments of the operations described herein may be implemented in a computer-readable storage device having stored thereon instructions that when executed by one or more processors perform the methods. The processor may include, for example, a processing unit and or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and or later and or related versions of this specification.

As used in any embodiment herein, the term "logic" may refer to the logic of the instructions of an app, software, and or firmware, and or the logic embodied into a programmable circuitry by a configuration bit stream, to perform any of the aforementioned operations. Software may be embodied as a software package, code, instructions, instruction sets and or data recorded on non-transitory computer readable storage medium. Firmware may be embodied as code, instructions or instruction sets and or data that are hard-coded (e.g., nonvolatile) in memory devices.

"Circuitry", as used in any embodiment herein, may comprise, for example, singly or in any combination, hardwired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and or logic implementation(s) for the various logic and or circuitry described herein. For example, in one embodiment the hardware description language may comply or be compatible with a very high speed integrated circuits (VHSIC) hardware description language (VHDL) that may enable semiconductor fabrication of one or more circuits and or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and or other versions of the IEEE VHDL standards and or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and or memory (shared, dedicated, or group) or in another computer hardware component or device that execute one or more software or firmware programs having executable machine instructions (generated from an assembler and or a compiler) or a combination, a combinational logic circuit, and or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are non-limiting examples:

Example 1. An apparatus for a load control system to control a load suspended from a carrier, comprising: a computer processor and a memory; a sensor suite to obtain a sensor data regarding a position and orientation of the load control system and or load; a data fusion module in the memory to determine an estimated state of the load control system and or load based on the sensor data; a fan array; and a decision and control module in the memory to control the fan array to output at least one of a lateral force or torque on the load control system and or load based on the estimated state of the load control system and or load to control the load suspended from the carrier; wherein the load control system, including the sensor suite, are configured to be located proximate to the load at a bottom of a suspension cable spanning between the load and the carrier.

Example 2. The apparatus according to example 1 or another claim or example herein, wherein the load control system and load are subject to an external force, wherein the external force is from at least one of movement of the load by the carrier, an environmental wind, or a wind generated by the carrier and wherein the external force causes or contributes to an undesired movement of the load control system and the load, and wherein to control the load suspended from the carrier is to counteract the undesired movement of the load.

Example 3. The apparatus according to example 1 or another claim or example herein, wherein to determine the estimated state of the load control system and or load based on the sensor data comprises recursively predicting the estimated state based on a last previously estimated state, the sensor data, a system model, and an estimate of uncertainty of the estimated state.

Example 4. The apparatus according to example 3 or another claim or example herein, wherein recursively predicting the estimated physical state based on a last previously estimated physical state, the sensor data, the system model, and the estimate of uncertainty of the estimated physical state comprises processing the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 5. The apparatus according to example 3 or another claim or example herein, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 6. The apparatus according to example 1 or another claim or example herein, wherein to control the fan array to output at least one of the lateral force or torque on the load control system and or load based on the estimated state of the load control system and or load to control the load suspended from the carrier comprises to output frame states for the estimated state of the load control system and or load, translate the frame states into multi-input multi-output ("MIMO") control laws, determine an actuator matrix for the fan array, and output the MIMO control laws to the fan array according to the actuator matrix.

Example 7. A computer implemented method to control a load suspended from a carrier, comprising: with a computer processor and memory, obtaining a sensor data from a sensor suite regarding a position and orientation of the load; determining an estimated state of the load based on the sensor data; controlling a fan array to output at least one of a lateral force or torque on the load based on the estimated state of the load to control the load suspended from the carrier; wherein the computer processor and memory and the sensor suite are configured to be located proximate to the load at a bottom of a suspension cable spanning between the load and the carrier.

Example 8. The computer implemented method according to example 7 or another claim or example herein, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load control system and the load.

Example 9. The computer implemented method according to example 7 or another claim or example herein, wherein determining the estimated state of the load control system and or load based on the sensor data comprises recursively predicting the estimated state based on a last previously estimated state, the sensor data, a system model, and an estimate of uncertainty of the estimated state.

Example 10. The computer implemented method according to example 9 or another claim or example herein, wherein recursively predicting the estimated physical state based on a last previously estimated physical state, the sensor data, the system model, and the estimate of uncertainty of the estimated physical state comprises processing the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 11. The computer implemented method according to example 9 or another claim or example herein, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 12. The computer implemented method according to example 7 or another claim or example herein, wherein controlling the fan array to output at least one of the lateral force or torque on the load based on the estimated state of the load to control the load suspended from the carrier comprises outputting frame states for the estimated state of the load control system and or load, translating the frame states into multi-input multi-output ("MIMO") control laws, determining an actuator matrix for the fan array, and outputting the MIMO control laws to the fan array according to the actuator matrix.

Example 13. A computer apparatus to control a load suspended from a carrier, comprising: means to obtain a sensor data from a sensor suite regarding a position and orientation of the load; means to determine an estimated state of the load based on the sensor data; means to control a fan array to output at least one of a lateral force or torque on the load based on the estimated state of the load to control the load suspended from the carrier; wherein the means to obtain the sensor data, the means to determine the estimated state of the load, and means to control the fan array are configured to be located proximate to the load at a bottom of a suspension cable spanning between the load and the carrier.

Example 14. The computer apparatus according to example 13 or another claim or example herein, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load.

Example 15. The computer apparatus according to example 13 or another claim or example herein, wherein the means to determine the estimated state of the load control system and or load based on the sensor data comprises means to recursively predict the estimated state based on a last previously estimated state, the sensor data, a system model, and an estimate of uncertainty of the estimated state.

Example 16. The computer apparatus according to example 15 or another claim or example herein, wherein means to recursively predict the estimated physical state based on a last previously estimated physical state, the sensor data, the system model, and the estimate of uncertainty of the estimated physical state comprises means to process the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 17. The computer apparatus according to example 15 or another claim or example herein, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 18. The computer apparatus according to example 13 or another claim or example herein, wherein the means to control the fan array to output at least one of the lateral force or torque on the load based on the estimated state of the load to control the load suspended from the carrier comprises means to output frame states for the estimated state of the load control system and or load, translate the frame states into multi-input multi-output ("MIMO") control laws, determine an actuator matrix for the fan array, and output the MIMO control laws to the fan array according to the actuator matrix.

Example 19. One or more computer-readable media comprising instructions that cause a computer device, in response to execution of the instructions by a processor of the computer device, to: obtain a sensor data from a sensor suite regarding a position and orientation of the load; determine an estimated state of the load based on the sensor data; control a fan array to output at least one of a lateral force or torque on the load based on the estimated state of the load to control the load suspended from the carrier; wherein the computer device is located proximate to the load at a bottom of a suspension cable spanning between the load and the carrier.

Example 20. The computer-readable media comprising instructions according to example 19 or another claim or example herein, wherein the load is subject to an external force, wherein the external force is from at least one of movement of the load by the carrier, an environmental wind, or a wind generated by the carrier and wherein the external force causes or contributes to an undesired movement of the load, and wherein to control the load suspended from the carrier is to counteract the undesired movement of the load.

Example 21. The computer-readable media comprising instructions according to example 19 or another claim or example herein, wherein to determine the estimated state of the load control system and or load based on the sensor data comprises to recursively predict the estimated state based on a last previously estimated state, the sensor data, a system model, and an estimate of uncertainty of the estimated state.

Example 22. The computer-readable media comprising instructions according to example 21 or another claim or example herein, wherein to recursively predict the estimated physical state based on a last previously estimated physical state, the sensor data, the system model, and the estimate of uncertainty of the estimated physical state comprises to process the last previously estimated physical state, the sensor data, and the estimate of uncertainty of the estimated physical state in the system model with at least one of a non-linear data fusion method, a real-time kinetic algorithm, a Kalman filter, an unscented Kalman filter, a complimentary filter, or a transfer function model.

Example 23. The computer-readable media comprising instructions according to example 21 or another claim or example herein, wherein the system model comprises at least one of mass of SLCS and load, cable length, inertia of SLCS and load, movement and rotation SLCS, movement and rotation of the carrier, and disturbance estimations of wind force, sea state, and relative SLCS and helicopter motion.

Example 24. The computer-readable media comprising instructions according to example 19 or another claim or example herein, wherein to control the fan array to output at least one of the lateral force or torque on the load based on the estimated state of the load to control the load suspended from the carrier comprises to output frame states for the estimated state of the load control system and or load, translate the frame states into multi-input multi-output ("MIMO") control laws, determine an actuator matrix for the fan array, and output the MIMO control laws to the fan array according to the actuator matrix.

Example 25. An apparatus to rotate or laterally move a load suspended on a suspension cable, comprising: a thruster, a thruster controller, and a sensor suite, wherein the sensor suite is to obtain a sensor data, wherein the sensor data comprises a last-measured orientation of the load; a computer processor and a memory, wherein the memory comprises a gain adjustment module and a decision and control module; wherein the computer processor is to execute the gain adjustment module and the decision and control module, wherein the gain adjustment module is to change a parameter of the decision and control module to control a gain of a thrust control signal of the decision and control module and wherein the decision and control module is to determine the thrust control signal based at least in part on the last-measured orientation of the load, a target orientation or position of the load, and the parameter and is to output the thrust control signal; and wherein the thruster controller is to act on the thrust control signal to cause the thruster to output a thrust, wherein the thrust is to rotate or propel the load suspended on the suspension cable.

Example 26. The apparatus according to Example 25 or another claim or example herein, wherein the target orientation or position is one of a specified position or an orientation or position away from a current orientation or position.

Example 27. The apparatus according to Example 25 or another claim or example herein, wherein the thrust is to rotate or propel the load suspended on the suspension cable to the target orientation or position with reduced seeking behavior.

Example 28. The apparatus according to Example 25 or another claim or example herein, wherein the decision and control module comprises a control loop, wherein the control loop is to determine the thrust control signal based at least in part on the last-measured orientation of the load, the target orientation or position of the load, and the parameter.

Example 29. The apparatus according to Example 25 or another claim or example herein, wherein the parameter modifies a function, wherein the function processes a difference between the last-measured orientation of the load and the target orientation to output the thrust control signal.

Example 30. The apparatus according to Example 28 or another claim or example herein, wherein the control loop comprises one of an open loop, a closed loop, or a feed-forward loop.

Example 31. The apparatus according to Example 28 or another claim or example herein, wherein the control loop is to adjust a control variable (CV) based on a measured process variable (PV) and a setpoint (SP), wherein the control variable is the thrust control signal, the setpoint is the target orientation, and the measured process variable is the last-measured orientation of the load.

Example 32. The apparatus according to Example 28 or another claim or example herein, wherein the control loop comprises a proportional, integral, and derivative controller ("PID controller").

Example 33. The apparatus according to Example 32 or another claim or example herein, wherein the control loop is organized in a cascade control architecture.

Example 34. The apparatus according to Example 28 or another claim or example herein, wherein the control loop determines an error based on a difference between the last-measured orientation of the load and the target orientation and determines at least one of a proportional-based response to the error, an integral-based response to the error, and a derivative-based response to the error.

Example 35. The apparatus according to Example 34 or another claim or example herein, wherein the error is limited to a maximum amount.

Example 36. The apparatus according to Example 34 or another claim or example herein, wherein to determine the proportional-based response to the error, the control loop is to apply a gain factor constant to the error.

Example 37. The apparatus according to Example 34 or another claim or example herein, wherein to determine the integral-based response to the error, the control loop is to determine an integral of the error over time.

Example 38. The apparatus according to Example 34 or another claim or example herein, wherein to determine the derivate-based response to the error, the control loop is to determine a derivative of the error over time.

Example 39. The apparatus according to Example 34 or another claim or example herein, wherein the gain adjustment module is to apply a gain control schedule to change the parameter, wherein the parameter modifies at least one of the proportional-based response to the error, the integral-based response to the error, and the derivative-based response to the error.

Example 40. The apparatus according to Example 39 or another claim or example herein, wherein the gain control schedule is based on an operating point value.

Example 41. The apparatus according to Example 40 or another claim or example herein, wherein the operating point value comprises at least one of an estimated rotational inertia of at least one of the apparatus and the load and a disturbance estimation with respect to at least one of the apparatus and the load.

Example 42. The apparatus according to Example 40 or another claim or example herein, wherein the operating point is determined based on a plurality of test points.

Example 43. The apparatus according to Example 42 or another claim or example herein, wherein the operating point is determined based on linear interpolation between the plurality of test points.

Example 44. The apparatus according to Example 40 or another claim or example herein, wherein the operating point comprises a rotational inertia and the rotational inertia is limited based on a maximum rotational inertia for a configuration of the apparatus.

Example 45. The apparatus according to Example 44 or another claim or example herein, wherein the maximum rotational inertia for the configuration of the apparatus is selected based on a thruster-to-thruster distance for thrusters in the apparatus.

Example 46. The apparatus according to Example 40 or another claim or example herein, wherein the operating point value is determined based on a system model.

Example 47. The apparatus according to Example 40 or another claim or example herein, wherein the memory comprises a system model module, wherein the system model module is to output the operating point value.

Example 48. The apparatus according to Example 47 or another claim or example herein, wherein the system model module comprises an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

Example 49. The apparatus according to Example 47 or another claim or example herein, wherein the system model module comprises an Unscented Kalman Filter ("UKF").

Example 50. The apparatus according to Example 47 or another claim or example herein, wherein the operating point value comprises at least one of an estimated rotational inertia of at least one of the apparatus and the load and a disturbance estimation with respect to at least one of the apparatus and the load.

Example 51. The apparatus according to Example 34 or another claim or example herein, wherein to determine the thrust control signal the control loop is to sum the proportional-based response to the error, the integral-based response to the error, and the derivative-based response to the error.

Example 52. The apparatus according to Example 30 or another claim or example herein, wherein the feed-forward loop comprises a system model module.

Example 53. The apparatus according to Example 52 or another claim or example herein, wherein the system model module comprises an estimate of at least one of an angular rate of at least one of the apparatus and the load, a mass of the apparatus and load, a length of the suspension cable, a rotational inertia of the load, a rotation of the apparatus and load, a lateral movement of the apparatus and load, a lateral movement of a carrier, a disturbance estimation of wind force or a relative motion between the carrier and the load.

Example 54. A computer implemented method to rotate or laterally move a load suspended on a suspension cable, comprising: with a thruster, a thruster controller, and a sensor suite, obtaining from the sensor suite a sensor data, wherein the sensor data comprises a last-measured orientation of the load; determining a thrust control signal based at least in part on the last-measured orientation of the load, a target orientation or position of the load, and a parameter; changing the parameter to control a gain of the thrust control signal, and outputting the thrust control signal; and wherein the thruster controller is to act on the thrust control signal to cause the thruster to output a thrust, wherein the thrust is to rotate or propel the load suspended on the suspension cable to the target orientation or position.

Example 55. The method according to Example 54 or another claim or example herein, wherein the target orientation or position is one of a specified position or an orientation or position away from a current orientation or position.

Example 56. The method according to Example 54 or another claim or example herein, wherein the thrust is to rotate or propel the load suspended on the suspension cable to the target orientation or position with reduced seeking behavior.

Example 57. The method according to Example 54 or another claim or example herein, wherein the method comprises a control loop and further comprising, with the control loop, determining the thrust control signal based at least in part on the last-measured orientation of the load, the target orientation or position of the load, and the parameter.

Example 58. The method according to Example 54 or another claim or example herein, further comprising modifying a function with the parameter, wherein the function processes a difference between the last-measured orientation of the load and the target orientation to output the thrust control signal.

Example 59. The method according to Example 56 or another claim or example herein, wherein the control loop comprises one of an open loop, a closed loop, or a feed-forward loop.

Example 60. The method according to Example 56 or another claim or example herein, adjusting with the control loop a control variable (CV) based on a measured process variable (PV) and a setpoint (SP), wherein the control variable is the thrust control signal, the setpoint is the target orientation, and the measured process variable is the last-measured orientation of the load.

Example 61. The method according to Example 56 or another claim or example herein, wherein the control loop comprises a proportional, integral, and derivative controller ("PID controller").

Example 62. The method according to Example 60 or another claim or example herein, wherein the control loop is organized in a cascade control architecture.

Example 63. The method according to Example 56 or another claim or example herein, further comprising, with the control loop, determining an error based on a difference between the last-measured orientation of the load and the target orientation and determining at least one of a proportional-based response to the error, an integral-based response to the error, and a derivative-based response to the error.

Example 64. The method according to Example 62 or another claim or example herein, wherein the error is limited to a maximum amount.

Example 65. The method according to Example 62 or another claim or example herein, wherein determining the proportional-based response to the error comprises applying a gain factor constant to the error.

Example 66. The method according to Example 62 or another claim or example herein, wherein determining the integral-based response to the error comprises determining an integral of the error over time.

Example 67. The method according to Example 62 or another claim or example herein, wherein determining the derivate-based response to the error comprises determining a derivative of the error over time.

Example 68. The method according to Example 62 or another claim or example herein, further comprising applying a gain control schedule to change the parameter, wherein the parameter modifies at least one of the proportional-based response to the error, the integral-based response to the error, and the derivative-based response to the error.

Example 69. The method according to Example 67 or another claim or example herein, further comprising applying the gain control schedule based on an operating point value.

Example 70. The method according to Example 68 or another claim or example herein, wherein the operating point value comprises at least one of an estimated rotational inertia of at least one of the apparatus and the load and a disturbance estimation with respect to at least one of the apparatus and the load.

Example 71. The method according to Example 68 or another claim or example herein, further comprising determining the operating point based on a plurality of test points.

Example 72. The method according to Example 70 or another claim or example herein, further comprising determining the operating point based on linear interpolation between the plurality of test points.

Example 73. The method according to Example 68 or another claim or example herein, wherein the operating point comprises a rotational inertia and limiting the rotational inertia based on a maximum rotational inertia for a configuration of the apparatus.

Example 74. The method according to Example 72 or another claim or example herein, further comprising selecting the maximum rotational inertia for the configuration of the apparatus based on a thruster-to-thruster distance for thrusters in the apparatus.

Example 75. The method according to Example 68 or another claim or example herein, wherein the operating point value is determined based on a system model.

Example 76. The method according to Example 68 or another claim or example herein, wherein the memory comprises a system model, and further comprising determining and outputting from the system model the operating point value.

Example 77. The method according to Example 75 or another claim or example herein, further comprising determining with the system model an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

Example 78. The method according to Example 75 or another claim or example herein, wherein the system model comprises an Unscented Kalman Filter ("UKF").

Example 79. The method according to Example 75 or another claim or example herein, wherein the operating point value comprises at least one of an estimated rotational inertia of at least one of the apparatus and the load and a disturbance estimation with respect to at least one of the apparatus and the load.

Example 80. The method according to Example 62 or another claim or example herein, wherein determining the thrust control signal comprises summing the proportional-based response to the error, the integral-based response to the error, and the derivative-based response to the error.

Example 81. The method according to Example 58 or another claim or example herein, wherein the feed-forward loop comprises a system model.

Example 82. The method according to Example 80 or another claim or example herein, further comprising with the system model, determining an estimate of at least one of an angular rate of at least one of the apparatus and the load, a mass of the apparatus and load, a length of the suspension cable, a rotational inertia of the load, a rotation of the apparatus and load, a lateral movement of the apparatus and load, a lateral movement of a carrier, a disturbance estimation of wind force or a relative motion between the carrier and the load.

Example 83. A computer apparatus to rotate or laterally move a load suspended on a suspension cable, comprising: means for a thruster, a thruster controller, and a sensor suite, means to obtain from the sensor suite a sensor data, wherein the sensor data comprises a last-measured orientation of the load; means to determine a thrust control signal based at least in part on the last-measured orientation of the load, a target orientation or position of the load, and a parameter; means to change the parameter to control a gain of the thrust control signal, and output the thrust control signal; and means for the thruster controller to act on the thrust control signal to cause the thruster to output a thrust, wherein the thrust is to rotate or propel the load suspended on the suspension cable.

Example 84. The computer apparatus according to Example 83 or another claim or example herein, wherein the target orientation or position is one of a specified position or an orientation or position away from a current orientation or position.

Example 85. The computer apparatus according to Example 83 or another claim or example herein, wherein the thrust is to rotate or propel the load suspended on the suspension cable to the target orientation or position with reduced seeking behavior.

Example 86. The computer apparatus according to Example 83 or another claim or example herein, further comprising means for a control loop, and means to determine, with the control loop, the thrust control signal based at least in part on the last-measured orientation of the load, the target orientation or position of the load, and the parameter.

Example 87. The computer apparatus according to Example 83 or another claim or example herein, further comprising means to modify a function with the parameter, and means for the function to process a difference between the last-measured orientation of the load and the target orientation to output the thrust control signal.

Example 88. The computer apparatus according to Example 84 or another claim or example herein, wherein the control loop comprises one of an open loop, a closed loop, or a feed-forward loop.

Example 89. The computer apparatus according to Example 84 or another claim or example herein, further comprising means for the control loop to adjust a control variable (CV) based on a measured process variable (PV) and a setpoint (SP), wherein the control variable is the thrust control signal, the setpoint is the target orientation, and the measured process variable is the last-measured orientation of the load.

Example 90. The computer apparatus according to Example 84 or another claim or example herein, wherein the control loop comprises a proportional, integral, and derivative controller ("PID controller").

Example 91. The computer apparatus according to Example 88 or another claim or example herein, wherein the control loop is organized in a cascade control architecture.

Example 92. The computer apparatus according to Example 84 or another claim or example herein, further comprising means to determine an error based on a difference between the last-measured orientation of the load and the target orientation and means for the control loop to determine at least one of a proportional-based response to the error, an integral-based response to the error, and a derivative-based response to the error.

Example 93. The computer apparatus according to Example 90 or another claim or example herein, further comprising means to limit the error to a maximum amount.

Example 94. The computer apparatus according to Example 90 or another claim or example herein, wherein means to determine the proportional-based response to the error comprises means to apply a gain factor constant to the error.

Example 95. The computer apparatus according to Example 90 or another claim or example herein, wherein to determine the integral-based response to the error comprises means for the control loop to determine an integral of the error over time.

Example 96. The computer apparatus according to Example 90 or another claim or example herein, wherein to determine the derivate-based response to the error comprises means for the control loop to determine a derivative of the error over time.

Example 97. The computer apparatus according to Example 90 or another claim or example herein, further comprising means for the control loop to apply a gain control schedule to change the parameter, wherein the parameter modifies at least one of the proportional-based response to the error, the integral-based response to the error, and the derivative-based response to the error.

Example 98. The computer apparatus according to Example 95 or another claim or example herein, further comprising means to determine the gain control schedule according to an operating point value.

Example 99. The computer apparatus according to Example 96 or another claim or example herein, further comprising means for the operating point value to comprise at least one of an estimated rotational inertia of at least one of the apparatus and the load and a disturbance estimation with respect to at least one of the apparatus and the load.

Example 100. The computer apparatus according to Example 96 or another claim or example herein, further comprising means to determine the operating point based on a plurality of test points.

Example 101. The computer apparatus according to Example 98 or another claim or example herein, further comprising means to determine the operating point based on linear interpolation between the plurality of test points.

Example 102. The computer apparatus according to Example 96 or another claim or example herein, wherein the operating point comprises a rotational inertia and the rotational inertia is limited based on a maximum rotational inertia for a configuration of the apparatus.

Example 103. The apparatus according to Example 100 or another claim or example herein, further comprising means to select the maximum rotational inertia for the configuration of the apparatus based on a thruster-to-thruster distance for thrusters in the apparatus.

Example 104. The computer apparatus according to Example 96 or another claim or example herein, further comprising means to determine the operating point value based on a system model.

Example 105. The computer apparatus according to Example 96 or another claim or example herein, further comprising means for a system model or another claim or example herein, wherein the system model is to determine and output the operating point value.

Example 106. The computer apparatus according to Example 103 or another claim or example herein, further comprising means for the system model to determine an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

Example 107. The computer apparatus according to Example 103 or another claim or example herein, further comprising means for an Unscented Kalman Filter ("UKF") to perform the system model.

Example 108. The computer apparatus according to Example 103 or another claim or example herein, wherein the operating point value comprises at least one of an estimated rotational inertia of at least one of the apparatus and the load and a disturbance estimation with respect to at least one of the apparatus and the load.

Example 109. The computer apparatus according to Example 90 or another claim or example herein, wherein means to determine the thrust control signal comprises means for the control loop to sum the proportional-based response to the error, the integral-based response to the error, and the derivative-based response to the error.

Example 110. The computer apparatus according to Example 86 or another claim or example herein, wherein the feed-forward loop comprises means for a system model.

Example 111. The computer apparatus according to Example 108 or another claim or example herein, wherein the system model comprises means to determine an estimate of at least one of an angular rate of at least one of the apparatus and the load, a mass of the apparatus and load, a length of the suspension cable, a rotational inertia of the load, a rotation of the apparatus and load, a lateral movement of the apparatus and load, a lateral movement of a carrier, a disturbance estimation of wind force or a relative motion between the carrier and the load.

Example 112. One or more computer-readable media comprising instructions that cause a computer device, in response to execution of the instructions by a processor of the computer device, to rotate or laterally move a load suspended on a suspension cable, comprising: with a thruster, a thruster controller, and a sensor suite, wherein the instructions are to cause the processor to obtain from the sensor suite a sensor data, wherein the sensor data comprises a last-measured orientation of the load; wherein the instructions are to cause the processor to determine a thrust control signal based at least in part on the last-measured orientation of the load, a target orientation or position of the load, and a parameter; wherein the instructions are to cause the processor to change the parameter to control a gain of the thrust control signal, and output the thrust control signal; and wherein the thruster controller is to act on the thrust control signal to cause the thruster to output a thrust, wherein the thrust is to rotate or propel the load suspended on the suspension cable.

Example 113. The computer-readable media according to Example 111 or another claim or example herein, wherein the target orientation or position is one of a specified position or an orientation or position away from a current orientation or position.

Example 114. The computer-readable media according to Example 111 or another claim or example herein, wherein the thrust is to rotate or propel the load suspended on the suspension cable to the target orientation or position with reduced seeking behavior.

Example 115. The computer-readable media according to Example 111 or another claim or example herein, wherein the instructions are to cause the processor to perform a control loop, wherein the control loop is to determine the thrust control signal based at least in part on the last-measured orientation of the load, the target orientation or position of the load, and the parameter.

Example 116. The computer-readable media according to Example 111 or another claim or example herein, wherein the instructions are to cause the processor to modify a function based on the parameter, wherein the function processes a difference between the last-measured orientation of the load and the target orientation to output the thrust control signal.

Example 117. The computer-readable media according to Example 112 or another claim or example herein, wherein the control loop comprises one of an open loop, a closed loop, or a feed-forward loop.

Example 118. The computer-readable media according to Example 112 or another claim or example herein, wherein the control loop is to adjust a control variable (CV) based on a measured process variable (PV) and a setpoint (SP), wherein the control variable is the thrust control signal, the setpoint is the target orientation, and the measured process variable is the last-measured orientation of the load.

Example 119. The computer-readable media according to Example 112 or another claim or example herein, wherein the control loop comprises a proportional, integral, and derivative controller ("PID controller").

Example 120. The computer-readable media according to Example 116 or another claim or example herein, wherein the control loop is organized in a cascade control architecture.

Example 121. The computer-readable media according to Example 112 or another claim or example herein, wherein the control loop is to determine an error based on a difference between the last-measured orientation of the load and the target orientation and is to determine at least one of a proportional-based response to the error, an integral-based response to the error, and a derivative-based response to the error.

Example 122. The computer-readable media according to Example 118 or another claim or example herein, wherein the instructions are to cause the process or limit the error to a maximum amount.

Example 123. The computer-readable media according to Example 118 or another claim or example herein, wherein to determine the proportional-based response to the error, the instructions are to cause the processor to apply a gain factor constant to the error.

Example 124. The computer-readable media according to Example 118 or another claim or example herein, wherein to determine the integral-based response to the error, the instructions are to cause the processor to determine an integral of the error over time.

Example 125. The computer-readable media according to Example 118 or another claim or example herein, wherein to determine the derivate-based response to the error, the instructions are to cause the processor to determine a derivative of the error over time.

Example 126. The computer-readable media according to Example 118 or another claim or example herein, wherein the instructions are to cause the processor to apply a gain control schedule to change the parameter, wherein the parameter modifies at least one of the proportional-based response to the error, the integral-based response to the error, and the derivative-based response to the error.

Example 127. The computer-readable media according to Example 123 or another claim or example herein, wherein the gain control schedule is based on an operating point value.

Example 128. The computer-readable media according to Example 124 or another claim or example herein, wherein the operating point value comprises at least one of an estimated rotational inertia of at least one of the apparatus and the load and a disturbance estimation with respect to at least one of the apparatus and the load.

Example 129. The computer-readable media according to Example 124 or another claim or example herein, wherein the instructions are to cause the processor to determine the operating point based on a plurality of test points.

Example 130. The computer-readable media according to Example 126 or another claim or example herein, wherein the instructions are to cause the processor to determine the operating point based on linear interpolation between the plurality of test points.

Example 131. The computer-readable media according to Example 124 or another claim or example herein, wherein the operating point comprises a rotational inertia and the rotational inertia is limited based on a maximum rotational inertia for a configuration of the apparatus.

Example 132. The computer-readable media according to Example 128 or another claim or example herein, wherein the instructions are to cause the processor to determine the maximum rotational inertia for the configuration of the apparatus based on a thruster-to-thruster distance for thrusters in the apparatus.

Example 133. The computer-readable media according to Example 124 or another claim or example herein, wherein the instructions are to cause the processor to determine the operating point value based on a system model.

Example 134. The computer-readable media according to Example 124 or another claim or example herein, wherein the instructions are to cause the processor to perform a system model, wherein the system model is to output the operating point value.

Example 135. The computer-readable media according to Example 131 or another claim or example herein, wherein the instructions are to cause the processor to perform the system model and to thereby determine an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

Example 136. The computer-readable media according to Example 131 or another claim or example herein, wherein the system model comprises an Unscented Kalman Filter ("UKF").

Example 137. The computer-readable media according to Example 131 or another claim or example herein, wherein the operating point value comprises at least one of an estimated rotational inertia of at least one of the apparatus and the load and a disturbance estimation with respect to at least one of the apparatus and the load.

Example 138. The computer-readable media according to Example 118 or another claim or example herein, wherein to determine the thrust control signal the instructions are to cause the processor to sum the proportional-based response to the error, the integral-based response to the error, and the derivative-based response to the error.

Example 139. The computer-readable media according to Example 114 or another claim or example herein, wherein the feed-forward loop comprises a system model.

Example 140. The computer-readable media according to Example 136 or another claim or example herein, wherein the instructions are to cause the processor to perform the system model and to thereby determine an estimate of at least one of an angular rate of at least one of the apparatus and the load, a mass of the apparatus and load, a length of the suspension cable, a rotational inertia of the load, a rotation of the apparatus and load, a lateral movement of the apparatus and load, a lateral movement of a carrier, a disturbance estimation of wind force or a relative motion between the carrier and the load.

The invention claimed is:

1. An apparatus to rotate or laterally move a load suspended on a suspension cable, comprising:

a thruster, a thruster controller, and a sensor suite, wherein the sensor suite is to obtain a sensor data, wherein the sensor data comprises a last-measured orientation of the load;

a computer processor and a memory, wherein the memory comprises a gain adjustment module and a decision and control module;

wherein the computer processor is to execute the gain adjustment module and the decision and control module, wherein the gain adjustment module is to apply a gain control schedule to change a parameter of the decision and control module to control a gain of a thrust control signal of the decision and control module and wherein the decision and control module is to determine the thrust control signal based at least in part on the last-measured orientation of the load, a target orientation or position of the load, and the parameter and is to output the thrust control signal;

and wherein the thruster controller is to act on the thrust control signal to cause the thruster to output a thrust, wherein the thrust is to rotate or propel the load suspended on the suspension cable.

2. The apparatus according to claim 1, wherein the gain control schedule is based on an operating point value.

3. The apparatus according to claim 2, wherein the operating point value comprises at least one of an estimated rotational inertia of at least one of the apparatus and the load and a disturbance estimation with respect to at least one of the apparatus and the load.

4. The apparatus according to claim 3, wherein the operating point is determined based on a plurality of test points.

5. The apparatus according to claim 4, wherein the operating point is determined based on linear interpolation between the plurality of test points.

6. The apparatus according to claim 3, wherein the operating point value is determined based on a system model.

7. The apparatus according to claim 6, wherein the system model comprises an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

8. A computer implemented method to rotate or laterally move a load suspended on a suspension cable, comprising:

with a thruster, a thruster controller, and a sensor suite, obtaining from the sensor suite a sensor data, wherein the sensor data comprises a last-measured orientation of the load;

determining a thrust control signal based at least in part on the last-measured orientation of the load, a target orientation or position of the load, and a parameter;

changing the parameter based on an operating point value to control a gain of the thrust control signal, and outputting the thrust control signal; and the thruster controller acting on the thrust control signal to cause the thruster to output a thrust, wherein the thrust is to rotate or propel the load suspended on the suspension cable to the target orientation or position.

9. The method according to claim 8, further comprising determining the operating point value.

10. The method according to claim 9, wherein the operating point value comprises at least one of an estimated rotational inertia of at least one of the apparatus and the load and a disturbance estimation with respect to at least one of the apparatus and the load.

11. The method according to claim 9, further comprising determining the operating point value based on linear interpolation between a plurality of test points.

12. The method according to claim 9, further comprising determining the operating point value based on a system model.

13. The method according to claim 12, wherein the system model comprises an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

14. A computer apparatus to rotate or laterally move a load suspended on a suspension cable, comprising:

with a thruster, a thruster controller, and a sensor suite, means to obtain from the sensor suite a sensor data, wherein the sensor data comprises a last-measured orientation of the load;

means to determine a thrust control signal based at least in part on the last-measured orientation of the load, a target orientation or position of the load, and a parameter;

means to change the parameter based on an operating point value to control a gain of the thrust control signal;

means to output the thrust control signal; and further comprising means for the thruster controller to act on the thrust control signal to cause the thruster to output a thrust, wherein the thrust is to rotate or propel the load suspended on the suspension cable to the target orientation or position of the load.

15. The apparatus according to claim 14, further comprising means to determine the operating point value.

16. The apparatus according to claim 15, wherein the operating point value comprises at least one of an estimated rotational inertia of at least one of the apparatus and the load and a disturbance estimation with respect to at least one of the apparatus and the load.

17. The apparatus according to claim 15, further comprising means to determine the operating point value based on linear interpolation between a plurality of test points.

18. The apparatus according to claim 15, further comprising means to determine the operating point value based on a system model.

19. The apparatus according to claim 18, wherein the system model comprises an estimate of at least one of an angular rate of at least one of the apparatus and the load, a mass of the apparatus and load, a length of the suspension cable, a rotational inertia of the apparatus and load, a rotation of the load, a lateral movement of the apparatus and load, a lateral movement of a carrier, a disturbance estimation of wind force or a relative motion between the carrier and the load.

* * * * *